United States Patent [19]
Spartz et al.

[11] Patent Number: 5,878,036
[45] Date of Patent: *Mar. 2, 1999

[54] WIRELESS TELECOMMUNICATIONS SYSTEM UTILIZING CDMA RADIO FREQUENCY SIGNAL MODULATION IN CONJUNCTION WITH THE GSM A-INTERFACE TELECOMMUNICATIONS NETWORK PROTOCOL

[76] Inventors: Michael K. Spartz, 540 Calle Capistrano, San Marcos, Calif. 92069; Daniel H. Agre, 9714 Caminito Mojado, San Diego, Calif. 92131; Barry R. Robbins, 4085 Porte La Paz, #179, San Diego, Calif. 92122

[ * ] Notice: This patent issued on a continued prosecution application filed under 37 CFR 1.53(d), and is subject to the twenty year patent term provisions of 35 U.S.C. 154(a)(2).

[21] Appl. No.: 575,413

[22] Filed: Dec. 20, 1995

[51] Int. Cl.⁶ .............................. H04B 7/216; H04Q 7/22
[52] U.S. Cl. ........................ 370/335; 370/342; 455/450; 455/466; 455/517; 455/560
[58] Field of Search ..................................... 370/312, 313, 370/328, 329, 331, 335, 337, 342, 347, 441, 465, 466, 467, 522; 340/825.34, 825.44; 375/200, 205, 206; 380/21, 23, 25, 44, 46, 49; 455/422, 426, 445, 450, 451, 452, 458, 31.1, 31.2, 38.1, 500, 507, 509, 511, 517, 523, 524, 550, 555, 557, 560, 561, 575, 466

[56] References Cited

U.S. PATENT DOCUMENTS

| | | | |
|---|---|---|---|
| 5,101,501 | 3/1992 | Gilhousen et al. | 455/422 |
| 5,237,569 | 8/1993 | Sekihata et al. | 370/394 |
| 5,239,294 | 8/1993 | Flanders et al. | 340/825.34 |
| 5,305,308 | 4/1994 | English et al. | 370/335 |
| 5,309,501 | 5/1994 | Kozik et al. | 379/58 |
| 5,329,573 | 7/1994 | Chang et al. | 379/58 |

(List continued on next page.)

FOREIGN PATENT DOCUMENTS

| | | | |
|---|---|---|---|
| 9430022 | 12/1994 | WIPO | H04Q 7/04 |
| 95246771 | 9/1995 | WIPO . | |
| 9621999 | 7/1996 | WIPO | H04Q 7/22 |

OTHER PUBLICATIONS

M. Mouly et al., "The GSM System for Moble Communications", *Michel Mouly Marie–Bernadette Pautet* . 1993, pp. 118–543.

(List continued on next page.)

*Primary Examiner*—Alpus H. Hsu
*Attorney, Agent, or Firm*—Russell B. Miller; Brian S. Edmonston; Thomas R. Rouse

[57] ABSTRACT

A method and apparatus for operating a wireless telecommunication system utilizing code division multiple access (CDMA) over-the-air with a Global System for Mobile communications (GSM) A-interface based network is described. A CDMA radio frequency (RF) signal interface provides a bi-directional interface to a subscriber unit, and a Global System for Mobile (GSM) communications A-interface SS7 transport provides a bi-directional interface with GSM mobile services switching center (MSC). Additionally, a transparent message transport is provided over which signaling messages defined in the GSM A-interface protocol are exchanged between the GSM MSC and a subscriber unit. Other signaling message generating by the GSM MSC and subscriber unit are processed and various actions are taken in response, including the configuration and control of signal processing resources. This configuration and control includes the allocation of vocoding and devocoding resources in accordance with the requested type of service, and the invocation of CDMA based encryption capabilities. Other actions include the allocation of CDMA traffic channel processing resources and selection resources at the start of a signaling exchange between the subscriber unit and the BSS or MSC. These resources process both voice and data calls, and signaling messages, such as registrations, from the subscriber unit. The CDMA traffic channel resources are used to perform the IS-95 style CDMA signal processing functions including modulation and demodulation.

6 Claims, 13 Drawing Sheets

U.S. PATENT DOCUMENTS

| | | | |
|---|---|---|---|
| 5,375,121 | 12/1994 | Nishino et al. | 370/473 |
| 5,396,543 | 3/1995 | Beeson, Jr. et al. | 370/349 |
| 5,412,375 | 5/1995 | Wood | 379/60 |
| 5,420,863 | 5/1995 | Taketsugu et al. | 370/337 |
| 5,425,029 | 6/1995 | Hluchyj et al. | 370/395 |
| 5,434,854 | 7/1995 | Focarile et al. | 370/335 |
| 5,455,841 | 10/1995 | Hazu | 375/240 |
| 5,481,544 | 1/1996 | Baldwin et al. | 370/392 |
| 5,640,386 | 6/1997 | Wiedman | 370/320 |
| 5,664,004 | 9/1997 | Durchman et al. | 455/466 |

OTHER PUBLICATIONS

Yeonghwan Techa et al., "A Subscriber Signalling Gateway between CDMA Mobile Station and GSM Mobile Switching Center", *IEEE*, 1993, pp. 181–185.

Kanti Prasad et al., "Design of a Protocol Controller for Wireless Information Networks", *IEEE*, 1992, pp. 519–524.

Marie–Bernadette Pautet et al., "GSM Protocol Architecture: Radio Sub–System Signalling", *IEEE*, 1991, pp. 326–332.

David P. Whipple, "North American Cellular CDMA", *Hewlett–Packard Journal,* No. 6, Dec. 1993, pp. 90–97.

"Use of the SCCP", GSM 08.06 Version 5.0.0: Mar. 1996, pp. 27–35.

"Functional Division Between Base Station System (BSS) and MSC", ETS 300 587–2, Jul. 1995, (GSM 08.02 version 4.2.0), pp. 10–20.

"Messages For Circuit–Switched Call Control", ETS 300 557, May 1996, (GSM 04.08 version 4.13.0), p. 252.

"Messages For Mobility Management", ETS 300 557, May 1996, (GSM 04.08 version 4.13.0), p. 233.

ETS 300 590, Jan. 1996, p. 44.

"Forward Traffic Channel Messages", ANSI J–STD–008, pp. 3–201.

"Paging Channel Messages", ANSI J–STD–008, pp. 3–117.

"Reverse Traffic Channel Messages", ANSI J–STD–008, pp. 2–277.

"Access Channel Messages", ANSI J–STD–008, pp. 2–242.

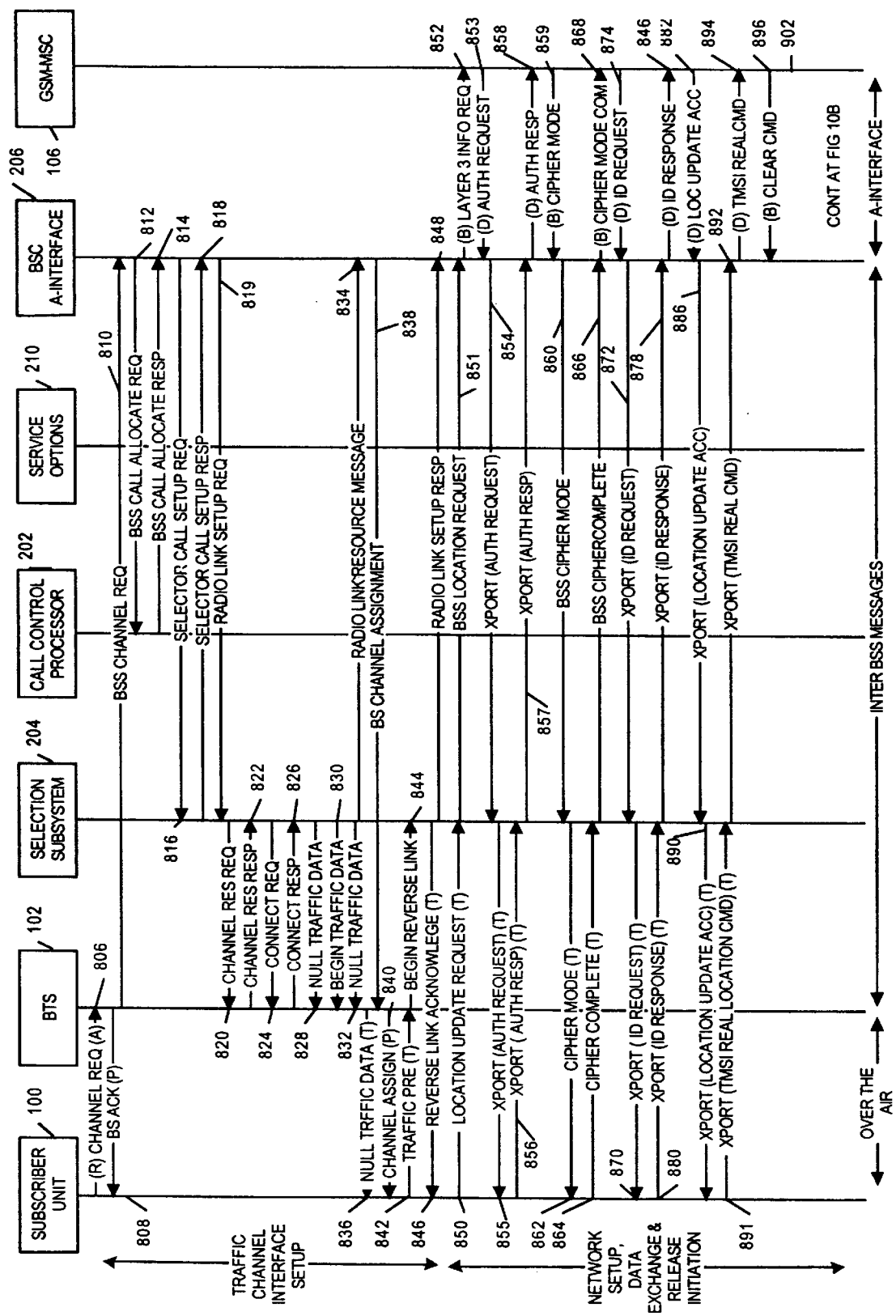

WIRELESS TELECOMMUNICATIONS SYSTEM UTILIZING CDMA RADIO FREQUENCY SIGNAL MODULATION IN CONJUNCTION WITH THE GSM A-INTERFACE TELECOMMUNICATIONS NETWORK PROTOCOL

BACKGROUND OF THE INVENTION

I. Field of the Invention

The present invention relates to wireless telecommunications. More particularly, the present invention relates to a novel and improved method and apparatus for providing wireless telecommunication service using a Code Division Multiple Access (CDMA) "over-the-air" interface in conjunction with a Global System for Mobile communications (GSM) A-interface protocol interface.

II. Description of the Related Art

The Global System for Mobile communications (GSM) wireless telecommunications standard is a set of widely available digital telecommunications protocols for use within a digital wireless telephone system. The GSM specifications were developed by an international effort and have been adopted by the European Telecommunications Standards Institute (ETSI, 06921 Sophia Antipolis Cedex, France). A wireless telephone system configured in a manner consistent with the use of the GSM standards is shown in FIG. 1. GSM mobile-services switching center (MSC) 16 switches or connects telephone calls between the wireless system access network, namely the base station subsystems (BSS) 15, and wireline based public switched telephone network (PSTN) 18, which may also be a public land mobile network (PLMN). GSM MSC 16 provides telephone switching, billing, subscriber unit tracking, subscriber unit authorization, and some handoff control functionality. BSS 15 is comprised of base station controller (BSC) 14 and any base transceiver station(s) (BTS) 12 coupled thereto. As defined in the GSM specifications, the interface between GSM MSC 16 and BSS 15 is referred to as the GSM "A interface," which separates the GSM network switching equipment from the time division multiple access (TDMA) based radio equipment. BSC 14 is involved with handoff processing and signal processing resource allocation within BTSs 12 so that multiple subscriber units 10 can conduct telephone calls simultaneously. BTS 12 interfaces the subscriber units 10 via radio frequency (RF) signals and a well defined "over-the-air" protocol to the GSM wireless network. BTS 12 comprises radio transmission and reception devices, up to and including antenna devices, and also all the signal processing specific to the radio interface. BTSs can be considered as complex radio modems. Subscriber unit 10 provides generic radio and processing functions to access the GSM network through the radio interface to either the user of subscriber unit 10 or some other terminal equipment, such as a facsimile machine or personal computer. A particular subscriber unit 10 may switch the BTS 12 with which it interfaces as its location changes, but can only communicate with one BTS at a given instant. Within this application, the capability to switch from one BTS 10 to another BTS 10, where only one radio interface exists at any instance, is referred to as subscriber unit hard handoff.

To make a wireless telephone call, a network connection must be established between subscriber unit 10, often referred to as a "mobile unit," and PSTN 18. PSTN 18 is the conventional wireline telephone system. To conduct the telephone call in a mobile fashion, a portion of the network connection is formed via the exchange of radio frequency (RF) signals between subscriber unit 10 and BTS 12. The remaining portion of the network connection is typically formed through wire based connections that pass through BSS 15 and through GSM MSC 16. In accordance with the GSM "over-the-air" protocol, which is one of the protocols that make up the GSM wireless telecommunications standard, TDMA technology is used to establish a set of channels within the above identified RF signals used to interface a subscriber unit 10 with a BTS 12. These channels are used to separate and distinguish the various sets of data associated with the various telephone calls being made at any given time. The various sets of data include user data which normally takes the form of digitized audio information, and signaling data which is comprised of the signaling messages used to orchestrate the processing of a telephone call.

At the time of the inception of the GSM standard, the use of TDMA within the GSM over-the-air protocol increased the efficiency with which the given radio frequency bandwidth could be used to conduct wireless telephone calls. Increasing the efficiency with which the available radio frequency bandwidth is used is desirable because only a limited amount of RF bandwidth exists, and the amount of bandwidth is usually the limiting factor as to the number of calls that can be conducted by a particular wireless cellular telephone system. Since the inception of the GSM wireless telecommunications protocol, however, other wireless technologies have been perfected that allow a greater number of telephone calls to be conducted in a given RF bandwidth. Since efficient use of radio frequency bandwidth is highly desirable, the use of these more efficient technologies is now preferred.

One prominent and widely accepted example of a more efficient wireless telecommunications technology is Code Division Multiple Access (CDMA) signal processing and the associated over-the-air IS-95 protocol adopted by the Telecommunications International Association (TIA, 2001 Pennsylvania Avenue, N.W., Washington, D.C. 20006). With CDMA modulation techniques, each user traffic channel consists of a carrier modulated by a different high speed binary sequence, thereby spreading the spectrum of the waveform. Sets of user traffic channels share the same wideband frequency spectrum allocation, and both user data and signaling messages are transmitted over a user traffic channel. Additionally, each CDMA based BTS transmits overhead control signaling channels that carry information to enable the subscriber unit to acquire and access the system. These overhead control channels are also modulated with a high speed binary sequence and combined with the user traffic channels to comprise one wideband RF signal. Each CDMA based BTS transmits the combined RF signal, referred to as the forward CDMA channel, and receives the combined RF outputs of a set of CDMA based subscriber units located within an associated coverage area, where these combined set of outputs are referred to as the reverse CDMA channel. The forward CDMA channel is the sum of the forward pilot channel, the forward synchronization channel, one or more forward paging channels, and many forward user traffic channels that are each modulated with a distinct channel code and are combined with a PN spreading sequence. The reverse CDMA channel is the sum of one or more reverse access channels and many reverse user traffic channels that are each modulated with a unique channel code and are transmitted with a specific PN spreading sequence.

CDMA based wireless communication systems also offer an improved method of handoff for subscriber unit mobility.

A handoff procedure known as "soft handoff" is afforded by the ability to utilize a subscriber unit's RF signals at more than one CDMA based BTS. This "soft handoff" ability of subscriber unit 10 to simultaneously engage in multiple RF interfaces with multiple CDMA based BTSs 12 provides transmission path redundancy as subscriber unit 10 moves from one location to another, thereby decreasing the chances of a call being dropped and of voice samples being lost. Additionally, the IS-95 protocol provides higher quality telecommunication service when compared to GSM since the CDMA signal is less susceptible to fade and noise interference. A subscriber unit communicating in accordance with the IS-95 protocol also consumes less power than a subscriber unit communicating in accordance with the GSM over-the-air protocol because the use of extensive power control algorithms are included in the normal operation of a CDMA system. This reduced power consumption allows the life of a battery used to power an IS-95 compliant subscriber unit to be extended beyond that of a GSM compliant subscriber unit.

Many regions having already existing GSM cellular telephone systems are reluctant to provide CDMA cellular telephone service despite it many benefits, however. This is because the incremental performance improvement provided by a CDMA system may not be sufficient to justify the cost of providing a completely new CDMA cellular telephone system when a previously existing system is available. This situation is in contrast to a region in which an entirely new cellular telephone system is to be built, where a CDMA cellular telephone system is often less costly to implement and provides higher quality service than a GSM cellular telephone system. If a method and system for implementing a CDMA cellular telephone system that utilized some of the existing GSM cellular telephone system infrastructure were devised, however, the cost of providing CDMA cellular telephone service in a region with an operating GSM cellular telephone system would be reduced. If the reduction were sufficient, the incremental performance benefit provided by a CDMA cellular telephone system could be justified in a greater number of locations. This would allow subscribers of cellular telephone service located in those regions to also have the benefit of CDMA cellular telephone service, and therefore such a method and system for implementing a cellular telephone system would be highly desirable.

SUMMARY OF THE INVENTION

A method and apparatus for operating a wireless telecommunication system utilizing CDMA over-the-air with a GSM A-interface based network is described. By utilizing the GSM A-interface standard, which is defined in the GSM specifications as the interface between the GSM MSC and the BSS, the CDMA wireless telecommunications system can be implemented using a GSM MSC conforming to the GSM specifications. This allows CDMA wireless cellular telephone service to be provided using some of the existing operating GSM network infrastructure. In the preferred embodiment of the invention, the CDMA based BSC communicates to the GSM MSC via the A interface as it is specified in the existing GSM standards. However, other embodiments of the invention may use modifications to the defined GSM A interface to enhance system operation and functionality. In accordance with one embodiment of the invention, the BSS and subscriber units interface via the use of radio frequency signals physically modulated in accordance with CDMA techniques. In the preferred embodiment of the invention, the CDMA modulation techniques are substantially similar to those incorporated in the IS-95 wireless telecommunications protocol previously referenced.

A high level diagram of the functional elements used to interface a subscriber unit and a GSM MSC, in accordance with one embodiment of the invention, is illustrated in FIG. 2. During operation of the system, CDMA RF interface 40 provides a bi-directional interface to subscriber unit 50, and GSM A-interface SS7 transport 42 provides a bi-directional interface with GSM MSC 52. Establishing the CDMA over-the-air interface and use of transparent signaling transport 44 allows the signaling messages defined in the GSM A-interface protocol to be exchanged between GSM MSC 52 and subscriber unit 50. Processing and service conversion 46 receives and examines certain signaling messages from CDMA RF interface 40 and GSM A-interface SS7 transport 42 and takes various actions in response, including the configuration and control of signal processing resources 48. This configuration and control includes the allocation of vocoding and devocoding resources in accordance with the requested type of service, and the invocation of CDMA based encryption capabilities. Other actions include the allocation of CDMA traffic channel processing resources and selection resources at the start of a signaling exchange between the subscriber unit and the BSS or MSC. These resources are allocated for both the processing of voice and data calls, and for signaling exchanges, such as registrations, between subscriber unit 50 and the system. The CDMA traffic channel resources are used to perform the IS-95 style CDMA modulation and demodulation functions.

A set of call processing procedures are provided for performing various tasks associated with the proper processing of a wireless telephone call or communication. These procedures include call initiation, call release, subscriber unit registration, over-the-air signal encryption, subscriber unit authentication, and the sequences of signaling messages and processing steps associated with these procedures are described in the detailed description of the invention. In accordance with one of the described embodiments of the invention, call initiation and subscriber unit registration are performed by first establishing a CDMA over-the-air interface between a subscriber unit and a CDMA based BSS, and by then establishing a telecommunications network connection between the subscriber unit and a GSM MSC. The invention also employs the use of CDMA encryption techniques. CDMA encryption techniques, used to provide subscriber information and location privacy, are initiated and terminated via the GSM encryption procedures controlled by GSM MSC 52.

In one embodiment of the invention, transparent signaling transport 44 transparently passes signaling information between GSM MSC 52 and subscriber unit 50. Transparent transport is defined as the exchange of signaling information between GSM MSC 52 and subscriber unit 50 such that no intermediate processing entity examines, modifies, or makes use of the information being transparently transported. The use of this transparent transport mechanism allows key portions of the application layer information exchanged between the CDMA based BTS and the subscriber unit to be identical to the information exchanged between a GSM TDMA based BTS and its associated GSM subscriber unit. In the preferred embodiment of the invention, transparent signaling transport 44 passes messages defined in the GSM specifications as Direct Transfer Application Part (DTAP) messages between GSM MSC 52 and subscriber unit 50. DTAP messages allow GSM MSC 52 and subscriber unit 50 to exchange data as necessary to properly process a GSM based telephone call. The DTAP message classification encompasses call management and subscriber unit mobility management functions. Allowing call management and subscriber unit mobility management messages to be transparently transported between the GSM MSC and the subscriber unit allows the invention to utilize many of the existing GSM call establishment related procedures. This, in turn, allows the invention to utilize the existing GSM A interface definition, enabling GSM wireless communication system operators to reuse their existing operating GSM infrastructure equipment in fielding a wireless communication system that utilizes CDMA over-the-air with their GSM A-interface based network.

In accordance with the present invention, a subscriber unit acquires the system, records system related information it receives from the BTS on the forward CDMA overhead channels, and then is configured to receive, process and transmit signaling messages used for establishing both the bidirectional CDMA over-the-air interface and the telecommunications network connection. A subscriber unit receives and appropriately processes CDMA radio resource, GSM call management, and GSM mobility management signaling messages. The GSM call management and GSM mobility management comprise the DTAP portion of the GSM A-interface. CDMA radio resource procedures include, but are not limited to, performing such actions as handoff, system access attempts, and bi-directional RF signal traffic channel establishment. GSM call management procedures include, but are not limited to, performing such actions as call establishment, supplementary service invocations, and subscriber unit alerting. GSM mobility management procedures include, but are not limited to, performing such actions as subscriber unit authentication, location updating, and international mobile station identity attach and detach procedures.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 10A and 10B are a message sequence diagram illustrating the signaling messages transmitted during a subscriber unit registration performed in accordance with one embodiment of the invention;

DETAILED DESCRIPTION OF THE PREFERRED EMBODIMENTS

Figure 1:
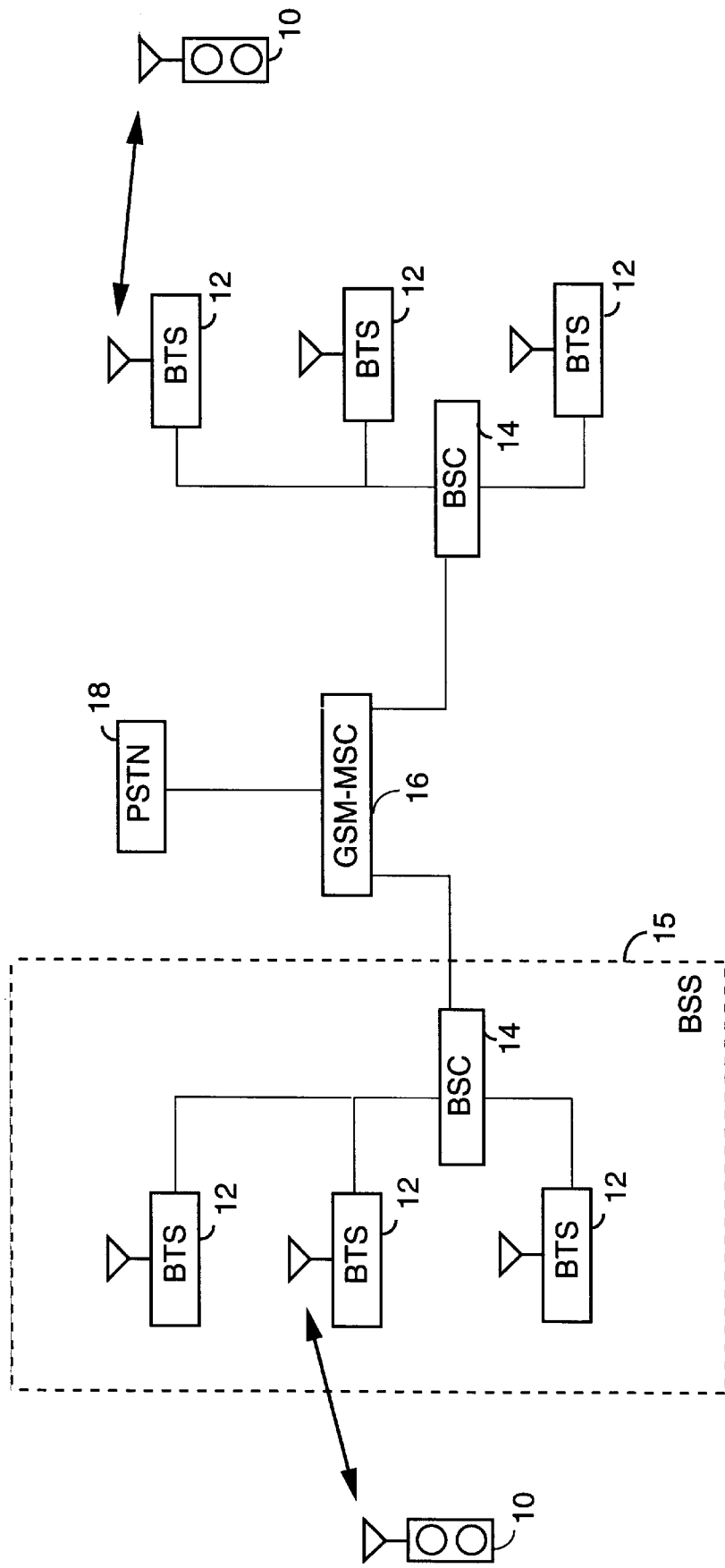
FIG. 1 is a block diagram of a cellular telephone system configured in accordance with the GSM standards.

A method and apparatus for providing wireless telecommunication service using a code division multiple access (CDMA) based over-the-air interface in conjunction with a global system for mobile communications (GSM) A-interface protocol network interface is described. In the following description, the invention is set forth in the context of a radio frequency signal interface operating in accordance with physical signal modulation technique of the IS-95 CDMA over-the-air protocol. While the described invention is especially suited for use with such signal modulation techniques, the use of other code division multiple access wireless telecommunications protocols is consistent with the practice of the present invention. Also, while the preferred embodiment of the invention incorporates the use of the GSM A-interface, other A-interfaces may also be employed where the use of a transparent transport mechanism between a mobile switching center and a subscriber unit is required. The invention may also be implemented in the context of a satellite based telecommunications system, or a point to point wireless telecommunications system. In particular, the invention is useful in the context of satellite based wireless telecommunication system incorporating the use of "bent pipe" transmission methods that must interface with a telecommunications network gateway, because many gateways will utilize the GSM A-interface protocol. Furthermore, it should be understood that the present invention is intended for use with various types of communications, including both voice based communications as well as communications during which digital data representing information other than voice is transmitted.

Throughout the application the use and transmission of various types of information is described including messages, requests, orders, instructions and commands. It should be understood that this information is constituted by electronic representations of these messages, requests, orders, instructions and commands, that are generated via the use of electric currents, voltage potentials, electromagnetic energy, or a combination thereof. Additionally, the following description contains reference to various systems for manipulation and generation of such information. In the preferred embodiment of the invention, such systems are implemented via the use of digital and analog integrated semiconductor circuits coupled to one another via various conductive connections or via the use of electromagnetic signals, or both. In other instances throughout the application, various well known systems are described in block form. This is done to avoid unnecessarily obscuring the disclosure of the present invention.

For purposes of the present invention, the GSM A interface definition encompasses the user data transmission and the control signaling between the GSM MSC and any connected BSCs. The control signaling is comprised of the physical signaling transport layers and the telephone call application information being transported. In the GSM standard, the signaling transport layers of the A interface are specified as the message transfer part (MTP) and signaling connection control part (SCCP) of signaling system number 7 (SS7), as defined by the International Telecommunications Union (ITU), which is well known in the art. The telephone call application data is transported between the GSM MSC and the BSC within the data field of the various SCCP messages.

Figure 3:
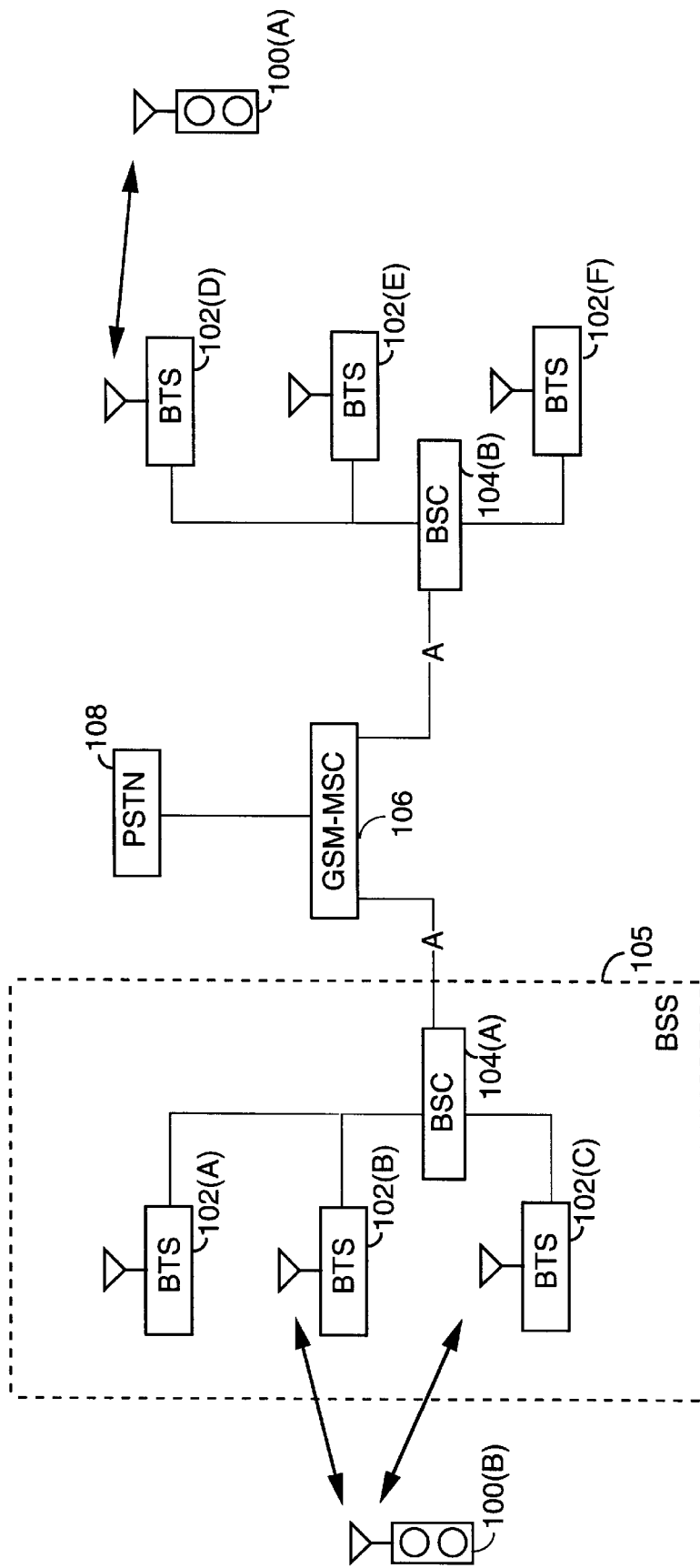
FIG. 3 is a block diagram of a cellular telephone system configured in accordance with one embodiment of the invention.

FIG. 3 is a block diagram of a wireless telephone system configured during normal operation in accordance with one embodiment of the invention. Base transceiver stations (BTS) 102(A)–(C) are coupled to BSC 104(A) and BTSs 102(D)–(F) are coupled to BSC 104(B). BSCs 104(A) and (B) are in turn coupled to GSM MSC 106 which is coupled to public switched telephone network (PSTN) 108 (can also be PLMN). Subscriber unit 100(A) is conducting a telephone call or other communication via the use of radio frequency (RF) signals exchanged with BTS 102(D). Subscriber unit 100(B) is conducting a telephone call or other communication via the use of RF signals exchanged with both BTS 102(B) and BTS 102(C). When engaged in an RF signal interface with two or more BTSs 102, as is the case with subscriber unit 100(B), subscriber unit 100(B) is said to be in "soft handoff." RF signals transmitted from BTS 102 to subscriber unit 100 are referred to as forward link channels, and RF signals transmitted from a subscriber unit 100 to a BTS 102 are referred to as reverse link channels. BSS 105 is made up of a BSC 104 and the set of one or more BTSs 102 to which it is coupled.

In the preferred embodiment of the invention, the physical signal processing of both the forward and reverse link channels is performed in accordance with the CDMA signal processing techniques of the IS-95 protocol. This physical signal processing includes the use of forward and reverse link spreading codes and channel codes during both the transmission and reception of the forward and reverse link signals. The channel codes are used to establish a set of channels over which various sets of data may be transmitted by direct sequence modulation. For the forward link, the channel codes are comprised of a set of sixty four orthogonal binary codes referred to as Walsh codes, and for the reverse link the channel codes are comprised of a set of binary long codes that calculated for each subscriber unit as a function of a unique subscriber unit identification code. The spreading codes are used to diversify the range of frequencies of which the data is transmitted so as to improve the likelihood of successful transmission. This diversification is referred to as spreading and is also performed via direct sequence modulation of the data being transmitted with the spreading codes. In the preferred embodiment of the invention, the channelization is performed via bi-phase shift key (BPSK) modulation and the spreading is performed via quad-phase shift key modulation (QPSK), in a similar fashion to an IS-95 compliant system.

In one embodiment of the invention, the forward link channels include one or more pilot channels, synchronization channels, paging channels, and user traffic channels, each defined by modulation with a predetermined forward link channel code. The reverse link channels include one or more access channels and many user traffic channels each defined by modulation with a unique reverse link long code.

In order for the transmission and reception of the forward and reverse link signals to be performed properly, the state of the channel and spreading codes used to process the forward and reverse link signals during reception and transmission must be synchronized. This synchronization is achieved during call set-up and is referred to as signal acquisition, many processes for which is well known in the art. Data being transmitted via either the forward or reverse link is divided into frames that also contain error correction bits and frame header bits. The frame header bits indicate whether the data contained in the frame is signaling data or traffic data, or a combination thereof. Traffic data is the data being transmitted by the user when the call is in progress and is usually digitized voice or audio information, but can be any type of user data. To transmit a complete signaling message, it is generally necessary to transmit multiple frames of signaling data, which are assembled into the signaling messages by the receiving system. As noted above, signaling messages are used to exchange any information between the various systems shown in FIG. 3 necessary to setup and process a telephone call. Once assembled each signaling message contains message header bits which indicate the type of signaling message.

Still referring to FIG. 3, as noted above, GSM MSC 106 provides telephone switching, billing, and subscriber unit tracking and authorization functionality. GSM MSC 106 and BSC 104 communicate in accordance with the GSM A-interface protocol which is part of the GSM standard. In order to set up a telephone call connection using GSM MSC 106, a particular set of signaling messages must be generated in a particular order containing a particular set of information. That is, BSC 104 must generate and transmit the proper set of signaling to GSM MSC in the proper order depending on the required network connections and the signaling messages received from GSM MSC 106. The order, information, and format associated with these sets of signaling messages are defined by the GSM A-interface protocol. As might be expected, the order, information and format differ substantially from any interface associated with a comparable MSC operating within a CDMA cellular telephone system. In a similar fashion, a subscriber unit 100 operating in accordance with the IS-95 or other CDMA based protocol must exchange a predetermined set of messages with BTS 102 in a predetermined order and in a predetermined format to properly set up and process a telephone call. As also might be expected, the CDMA over-the-air interface differs substantially with the over-the-air interface associated with GSM wireless telecommunications systems.

Figure 4:
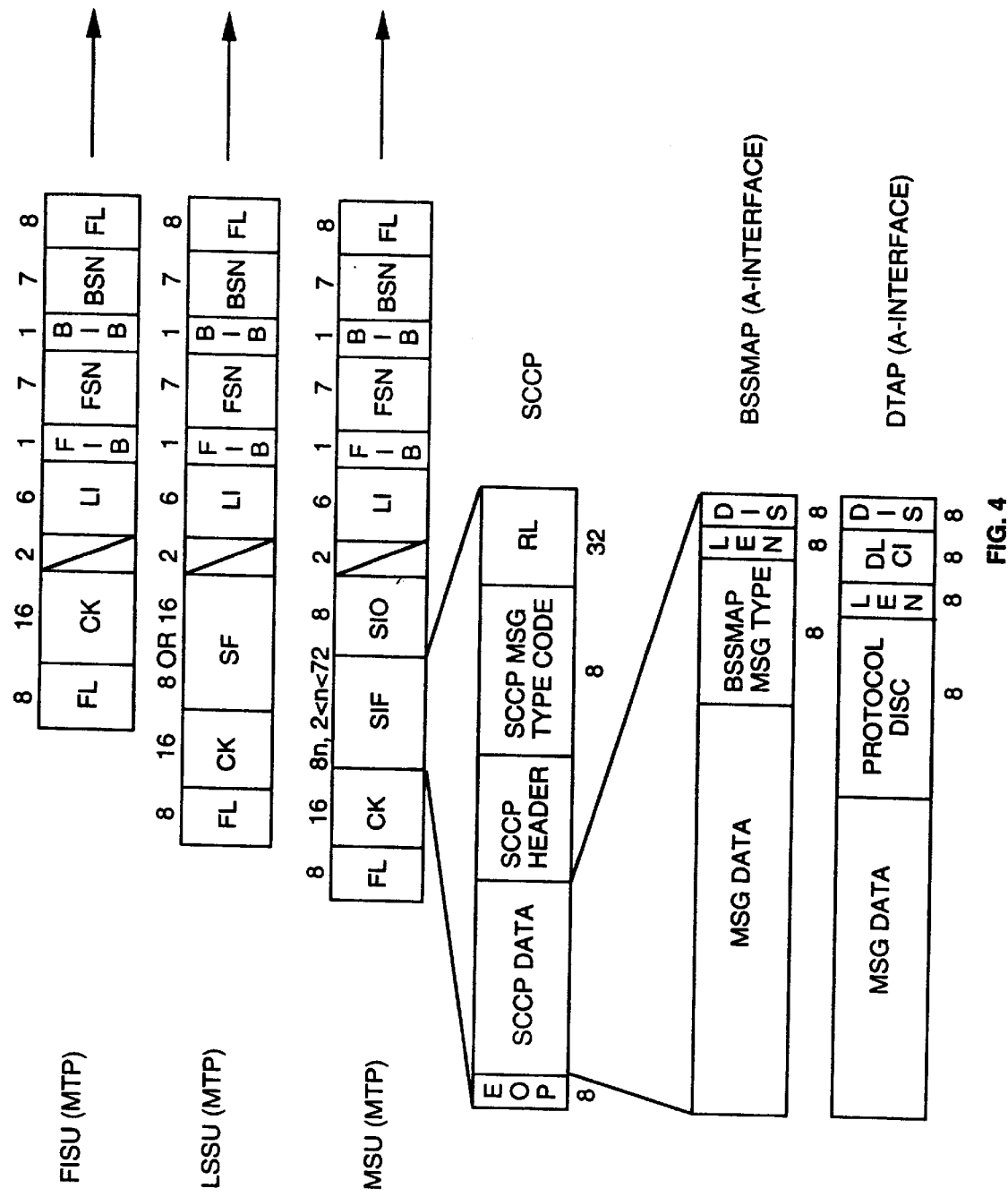
FIG. 4 is a diagram illustrating the various GSM A interface message formats transported utilizing the Signaling System Number 7 interface.

The signaling messages associated with the GSM A-interface protocol are separated into two categories: Direct Transfer Application Part (DTAP) messages and BSS Management Application Part (BSSMAP) messages. DTAP contain data relevant to the operation of subscriber unit 100 and MSC 106, and therefore do not directly affect the operation of BSS 105. BSSMAP messages are generally associated with the operation of BSS 105 and may cause resource allocation or provide information necessary to the proper operation of BSS 105. A BSSMAP message may affect the entire operation of BSS 105, or just the operation of a single phone call. Also in accordance with the GSM A interface, the signaling messages are transmitted via a Signaling System Number 7 (SS7) signaling link and the associated message transfer part (MTP) and signaling connection control part (SCCP). MTP utilizes three message formats to transmit binary data via a serial link. The three message formats are referred to as message signal units (MSU), link status signal units (LSSU), and fill-in signal units (FISU). The fields associated with each message format are illustrated in FIG. 4 with the number of bits associated with each field indicated below. The messages are separated via the use of a flag byte (FL) which contains a logic zero followed by a series of six logic ones followed by a logic zero (01111110). Within the messages defined by the flag bytes, a logic zero is inserted in any series of more than five logic ones.

Each message format is comprised of a header section containing a backward sequence number (BSN), a backward indication bit (BIB), a forward sequence number (FSN), a forward indication bit (FIB), and a length indicator (LI) followed by two buffer bits. Additionally, each message format includes a set of check bits (CK) inserted just before the terminating flag byte. For FISUs, no additional data fields are included. For LSSUs, a one or two byte status field (SF) is included which indicates one of six different status indications dealing with alignment status and out of service. For MSUs, a signal byte service information octet (SIO) and a two or more byte signal information field (SIF) are included. Since each message format contains a different amount of information, the type of message is determined from the length indicator field (LI). The signaling messages transmitted in accordance with the GSM A-interface are sent via a MSU with the data associated with the GSM A-interface signaling message placed in the SIF. More particularly, messages transmitted in accordance with the GSM A-interface are placed in SCCP messages which include a routing label (RL), an SCCP message type code, an SCCP header, and an SCCP data field as shown. The SCCP message type code is typically considered as a sub-field of the SCCP header. The SCCP message is terminated with an end of optional parameters flag (EOP). If the BSSMAP message transported inside the SCCP message is the type which relates to a single phone call, the phone call with which the message is associated is indicated in the connection identifier field in the SCCP header (not shown). A BSSMAP or DTAP message is contained within the SCCP data parameter with the type of message indicated by the discrimination bit (DIS) located at the beginning of the SCCP data field. If a BSSMAP message is being transmitted, the length is indicated in the length (LEN) field. Following the length are the type of BSSMAP message and the rest of the message. If a DTAP message is being transmitted, the length is indicated in the length (LEN) field, and the sub category of the DTAP message is indicated in the protocol discrimination field. Any additional data associated with the particular DTAP message including the message type is placed in the message data field.

Figure 2:
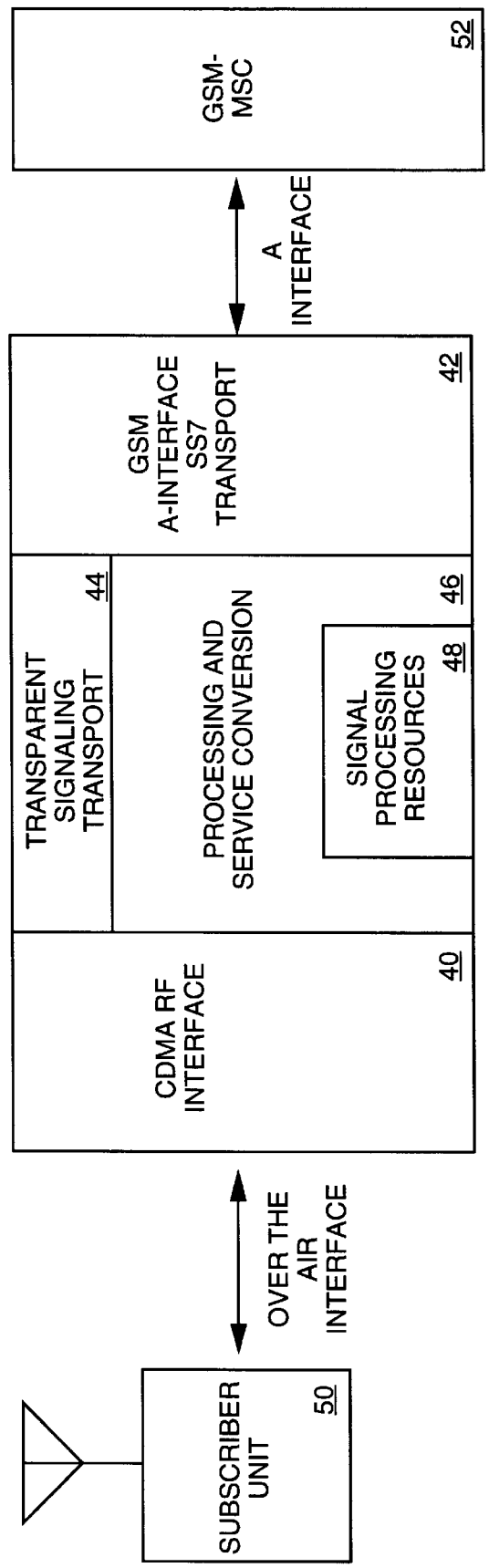
FIG. 2 is a functional block diagram of the message processing and service conversion architecture used to interface a subscriber unit and a GSM MSC in accordance with one embodiment of the invention.
Figure 5:
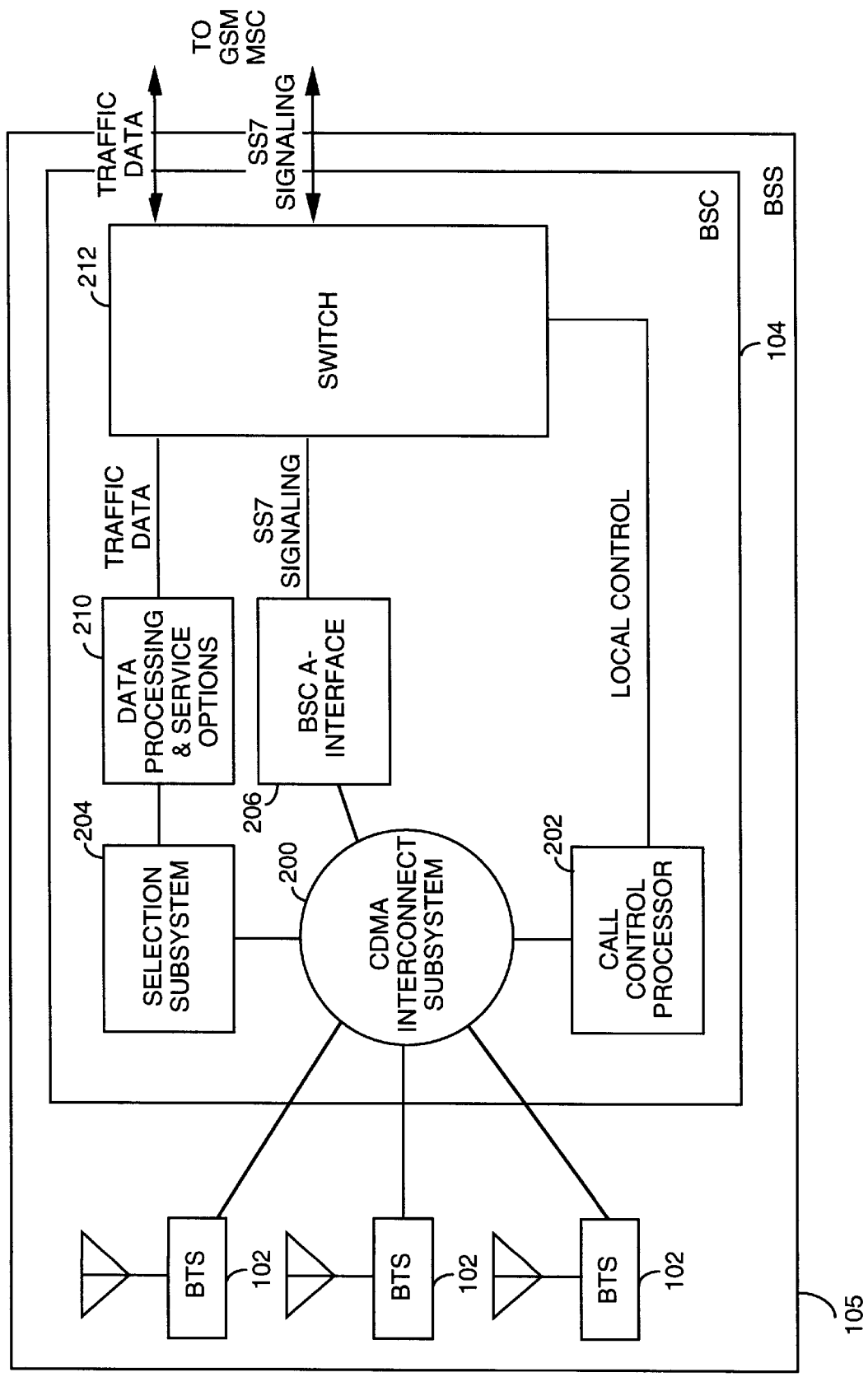
FIG. 5 is a block diagram of a base station subsystem configured in accordance with one embodiment of the invention.

FIG. 5 is a block diagram of BSS 105 configured to provide CDMA over-the-air telecommunications service in conjunction with a GSM A-interface protocol network interface in accordance with one embodiment of the invention. BTSs 102 are coupled to BSC 104 via wirebased links, which in the preferred embodiment of the invention constitutes a T1 or E1 connection, although other connections may be substituted including the use of microwave link. Within BSC 104, CDMA interconnect subsystem 200 is coupled to the set of BTSs 102 shown. CDMA interconnect subsystem 200 is also coupled to call control processor 202, selection subsystem 204, and BSC A-interface 206. CDMA interconnect subsystem 200 serves as a message and traffic router between the connected coupled entities and in the preferred embodiment of the invention is comprised of an asynchronous fixed length packet transport system. Data processing and service options system 210 is coupled to selection subsystem 204 and exchanges traffic data with switch 212. Switch 212 provides an interface to GSM MSC 106 of FIG. 2, consisting of traffic data and signaling, and also exchanges control data with call control processor 202. In the preferred embodiment of the invention, this signaling data is transmitted using the ITU Signaling System Number 7 (SS7) protocol as specified in the GSM A-interface protocol, the use of which is well known in the art. Each of the connections shown within BSC 104 is a high speed digital connection such as fast Ethernet, the use of which is also well known in the art. In alternative embodiments of the invention, switch 212 may be replaced with a simpler cross connect device, causing BSC A-interface 206 to be coupled directly to GSM MSC 106. However, the use of switch 212 is preferred because it allows BSC 104 to be coupled to multiple MSC systems if necessary, each of which can provide alternative types of network service including IS-41 service, the use of which is well known in the art. If BSC 104 is coupled to multiple MSC systems, additional BSC interface systems similar to BSC A-interface 206 are utilized in the preferred embodiment of the invention, not all of which must incorporate the use of the GSM A-interface protocol.

In the preferred embodiment of the invention, the systems that make up BSS 105 communicate and exchange traffic and signaling data via the use of an internal BSS protocol in which fixed length data packets are exchanged among the various other systems via CDMA interconnect subsystem 200, or via direct routing between the two systems involved. CDMA interconnect subsystem 200 performs this routing via the use of an address contained in each fixed length data packet. Generally, a first system transmitting a data packet to a second system places the address of that second system in the data packet, and then provides that data packet to CDMA interconnect subsystem 200. In the case of some adjacent systems, such as selection subsystem 204 and data processing and service option system 210, data packets are passed directly. Whether a particular fixed length packet contains traffic data or signaling data is indicated by packet header bits contained in each packet. Data packets containing traffic data are referred to as traffic packets and data packets containing signaling data are referred to as signaling packets. Control information is also exchanged between some systems within BSS 105 via the use of dedicated connections such as the one shown between call control processor 202 and switch 212. Other methods of networking the various systems within BSS 105 shown in FIG. 5, other than via CDMA interconnect subsystem 200, are consistent with the operation of the present invention.

A signaling message constitutes a complete instruction used to control both the operation of the various systems that make up BSS, as well as to exchange information with subscriber unit 100 or GSM MSC 106. A complete signaling message is transmitted via one or more signaling packets that are assembled by the receiving system to generate the signaling message being transmitted. In accordance with one embodiment of the present invention, a sub category of signaling message is defined that are transmitted through BSS 105 without affecting the operation of BSS 105. For purposes of this application such signaling messages are referred to as "transport messages," and the availability of transport messages forms a transparent transport function within BSS 105. The transparent transport function is generally used for exchanging a specific category of signaling messages between GSM MSC 106 and subscriber unit 100, defined as DTAP messages, by way of BSS 105. During the operation of BSS 105, call control processor 202 and BSC A-interface 206 configure and control the various other systems within BSS 105 via the use of other signaling messages, and generally throughout the application any configuration or other control exercised by call control processor 202 and BSC A-interface 206 is performed via the use of these signaling messages, which are passed as described above in the preferred embodiment of the invention, although the use of other message passing mechanisms such as direct interconnect between systems is also consistent with the present invention. In the preferred embodiment of the invention, call control processor 202 and BSC A-interface 206 are implemented via the use of computer systems controlled by software instructions. (Not shown)

One type of configuration and control performed by BSC A-interface 206 includes the allocation of selection resources within selection subsystem 204. A selection resource provides a bi-directional interface between subscriber unit 100 and any system within BSC 104 by way of one or more BTSs 102. The functions associated with this bi-directional interface include matching multiple copies of a data frame generated by two or more BTSs and selecting the highest quality data frame from the set of copies for further processing. This selection in made based on quality indication information placed in each frame by each BTS 102. The multiple copies of a frame are generated when subscriber unit 100 is engaged in multiple RF interfaces with multiple BTSs 102 during a soft handoff condition. Additionally, a selection resource receives data packets directed towards a subscriber unit 100, and forwards a copy of the data packet to each BTS 102 engaged in an RF interface with that subscriber unit 100. Each selection resource has its own internal address so that packets associated with the call being processed can be routed to that selection resource within selection subsystem 204. Each selection resource also tracks the set of BTSs 102 with which the subscriber unit 100 to which it is assigned is interfacing. In the preferred embodiment of the invention, the selection resource is constituted by a microprocessor or digital signal processor controlled by software instructions stored in a memory unit also located within selection subsystem 204. (Not shown)

BSC A-interface 206 also configures data processing and service options system 210 to process data from selection subsystem 204 in a variety of ways based on the services necessary to process the telephone call. The types of signal processing services provided include vocoding and devocoding the voice traffic data associated with a telephone call, the modulating and demodulation of tones and other signals used for the transmission of fax and other digital data via a standard PSTN connection, and the encryption of user and signaling data. In the preferred embodiment of the invention, the signal processing is done via the use of a digital signal processing integrated circuit located within data processing and service options system 210 and controlled via the use of software instructions stored in a memory system, the use of which is well known in the art. (Not shown) Another function performed by BSC A-interface 206 is to receive DTAP signaling messages from GSM MSC 106 transmitted in accordance with the A-interface, and to transport those signaling messages to the appropriate subscriber unit 100 by placing the message in transport messages, and forwarding the transport messages to the selector resource associated with the telephone call. Upon receiving the transport messages, the selector resource will forward the transport message to the subscriber unit 100 via the CDMA forward user traffic channel.

As noted above, data is exchanged between a BTS 102 and a subscriber unit 100 via multiple frames containing frame header bits indicating the type of data contained in that frame. In the preferred embodiment of the invention, both signaling and traffic data may be transmitted in a single frame in accordance with the IS-95 standard. No address is contained in the frame during the over the air transmission as the destination and source of each frame are indicated by the channel code used to modulate the data. In the preferred embodiment of the invention, each frame transmitted via the reverse link is received by a particular channel processing element (not shown) within a BTS 102. Each channel processing element in turn knows the internal address of the selector resource processing the call, and after extracting a frame from the reverse link signal the channel processing element forwards the frame to the selector resource. The selector resource then assembles signaling messages from frames containing signaling data and determines the type of signaling message based on signaling messages header bits contained in the signaling message. Transport signaling messages are transparently routed to BSC A-interface 206 by the selection resource via the use of the BSS transport messages described above. BSC A-interface proceeds to place a connection identifier associated with the phone call into the SCCP header field based on the selection resource transmitting the transport signaling message, and to transparently forward the transport signaling messages to the GSM MSC in accordance with the A-interface protocol. If the message is a non-transport or local signaling message, the selector resource and BSC A-interface 206 will process the message internally.

In accordance with one embodiment of the present invention, various procedures must be performed via the orderly exchange of signaling messages between the various systems shown in FIG. 5 in order to properly process a telephone call. The various procedures include call initiation, call release, and subscriber unit registration. FIGS. 6–10 are a set of a message sequence diagrams illustrating the signaling messages exchanged during the processes of call initiation, call release, and subscriber unit registration in accordance with one embodiment of the invention. The vertical lines shown in FIGS. 6–10 are each associated with the system identified in the box at the top of each line. The systems are subscriber unit 100, BTS 102, selector subsystem 204, call control processor 202, data processing and service options system 210, BSC A-interface 206, and GSM MSC 106. A horizontal arrow running between two vertical lines indicates the exchange of a signaling message between the associated systems. Time advances from top to bottom, so the higher up horizontal lines occur before those horizontal lines located lower down on the page. As indicted at the bottom of each page, messages exchanged between subscriber unit 100 and BTS 102 are transmitted via the bi-directional over-the-air interface, and messages exchanged between GSM MSC 106 and BSC A-interface 206 are transmitted in accordance with the GSM A-interface.

As noted above, a GSM signaling message exchanged between GSM MSC 106 and BSC A-interface 206 is transported within an SCCP signaling message which is contained within a message signaling unit (MSU) in accordance with the SS7 standard. Upon reception of an SCCP signaling message, BSC A-interface 206 first determines whether the message is associated with a particular communication or is directed to the operation of the entire BSS by examining the SCCP message type code field. If the message is associated with a particular communication or telephone call, BSC A-interface 206 determines which communication via the use of a connection identifier contained in the SCCP header.

BSC A-interface 206 then determines if the message is a DTAP or BSSMAP message by examining the discrimination field of the GSM A interface signaling message. If the GSM signaling message is a DTAP message, BSC A-interface proceeds to transparently transport the signaling message via a transport message as described above. If the message is a BSSMAP message, BSC A-interface determines the specific BSSMAP message through examination of the BSSMAP message type field. Based on the BSSMAP message type, BSC A-interface performs various steps as described below.

It should also be noted that for the purposes of the following description, signaling messages exchanged between selection subsystem 204 and subscriber unit 100 are shown by a single horizontal line between the two systems. Actually, however, the signaling message passes by way of one or more BTSs 102. The single line is used for ease of drawing when the signaling message requires no control processing or resource allocation by BTS 102. Similarly, signaling messages exchanged between BSC A-Interface 206 and GSM MSC 106 pass through switch 212, however a single line is shown because switch 212 performs no processing that is particularly relevant to the present invention. The CDMA over-the-air channel used to transmit a message to or from subscriber unit 100 is indicated in parentheses next to the associated message with a 'P' indicating a forward link paging channel, an 'A' indicating a reverse link access channel, and a 'T' indicating the forward link user traffic channel or the reverse link user traffic channel depending on the direction of transmission. Additionally, in FIGS. 6, 7 and 10 "traffic channel setup" is the process associated with establishing the forward and reverse link user traffic channel interface between subscriber unit 100 and BTS 102 and is indicated at the far left of the figure. "Network setup" is the process of establishing a telecommunications network connection with the other telecommunications system involved in the call and is also indicated at the far left. Signaling messages transparently routed via the use of transport messages are indicated by the notation "xport" with the associated signaling message in parentheses, and are referred to as "transport messages" throughout the specification.

Figure 7:
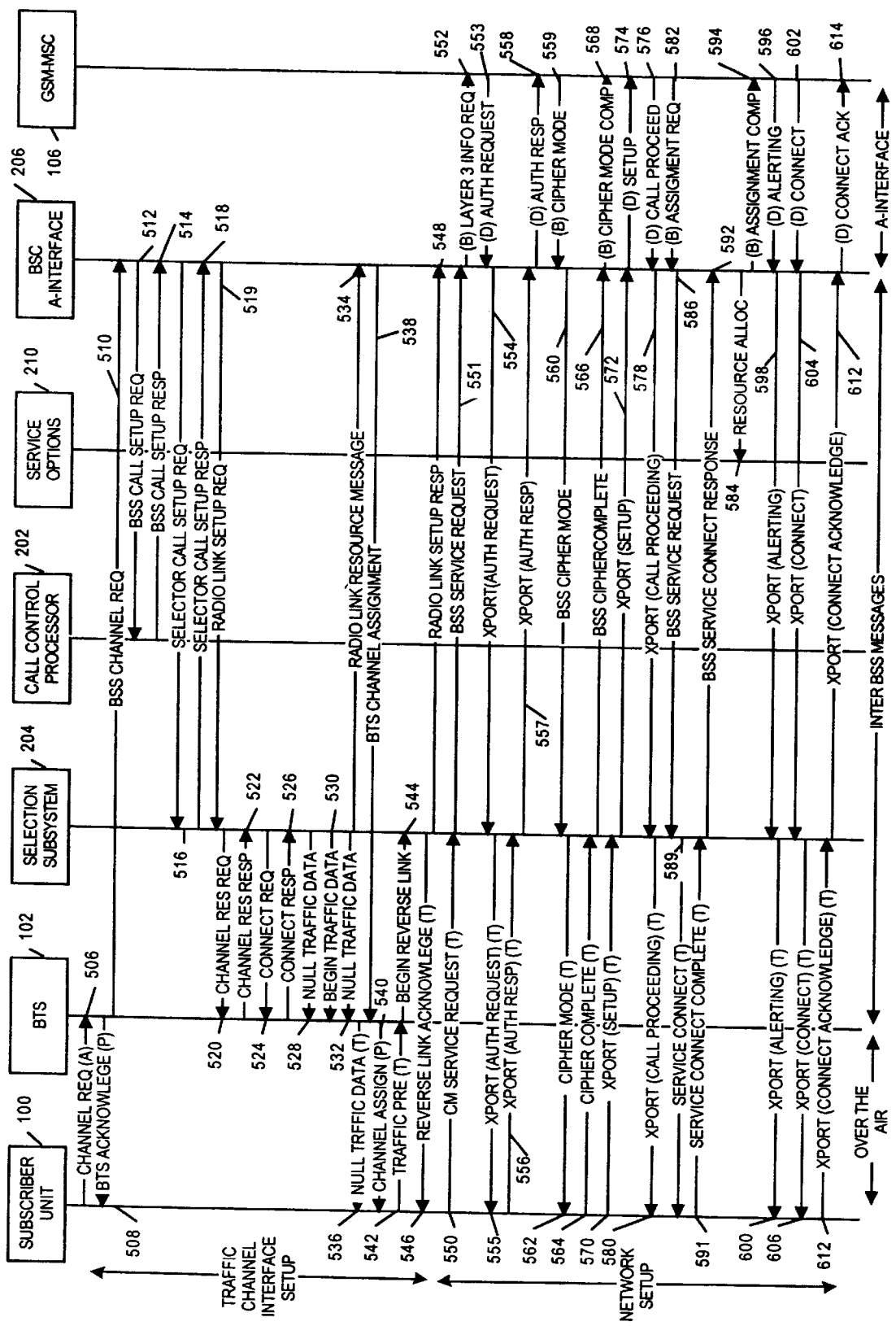
FIG. 7 is a message sequence diagram illustrating the signaling messages transmitted during a subscriber unit originated call initiation performed in accordance with one embodiment of the invention.
Figure 8:
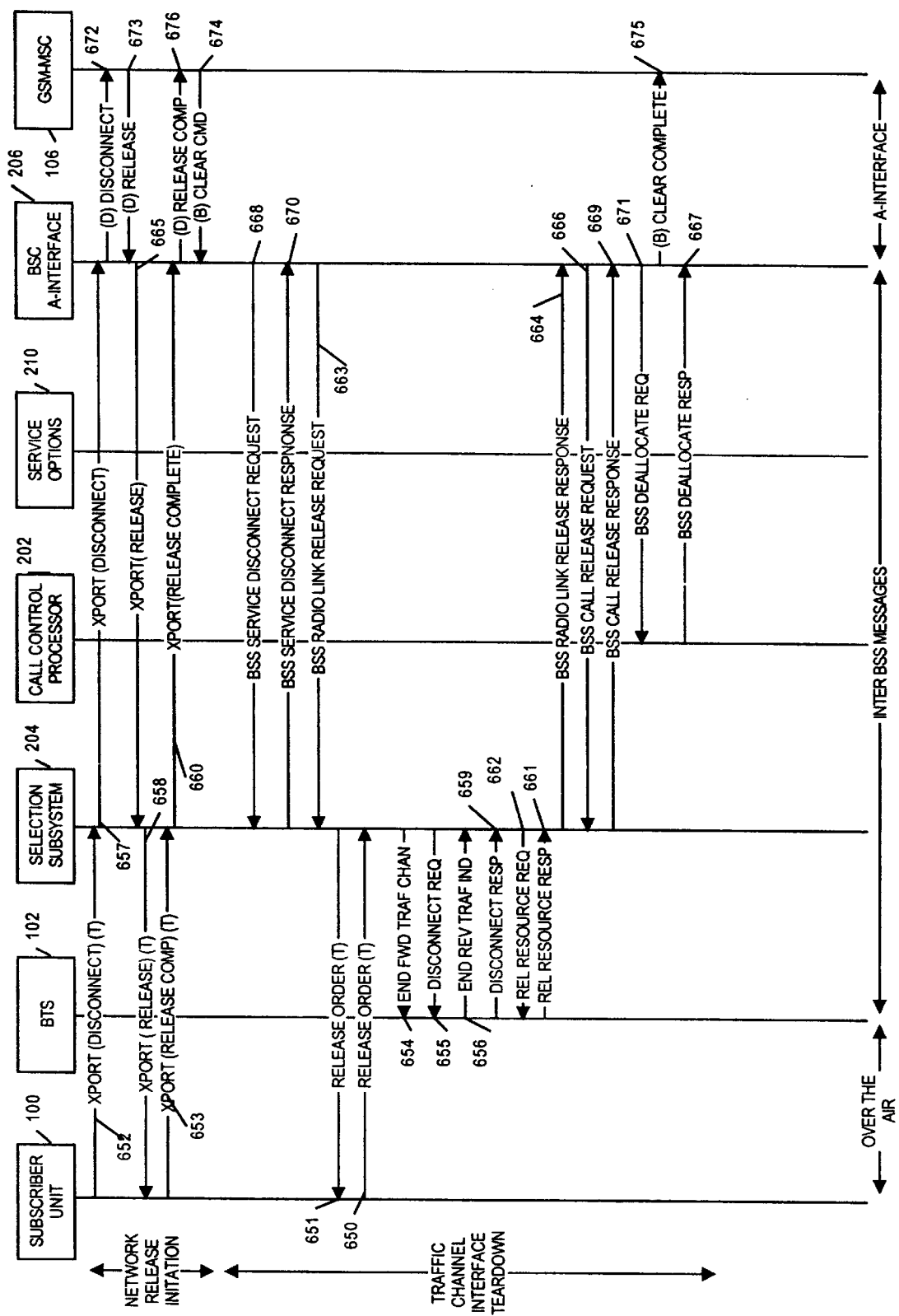
FIG. 8 is a message sequence diagram illustrating the signaling messages transmitted during a subscriber unit originated call release performed in accordance with one embodiment of the invention.
Figure 9:
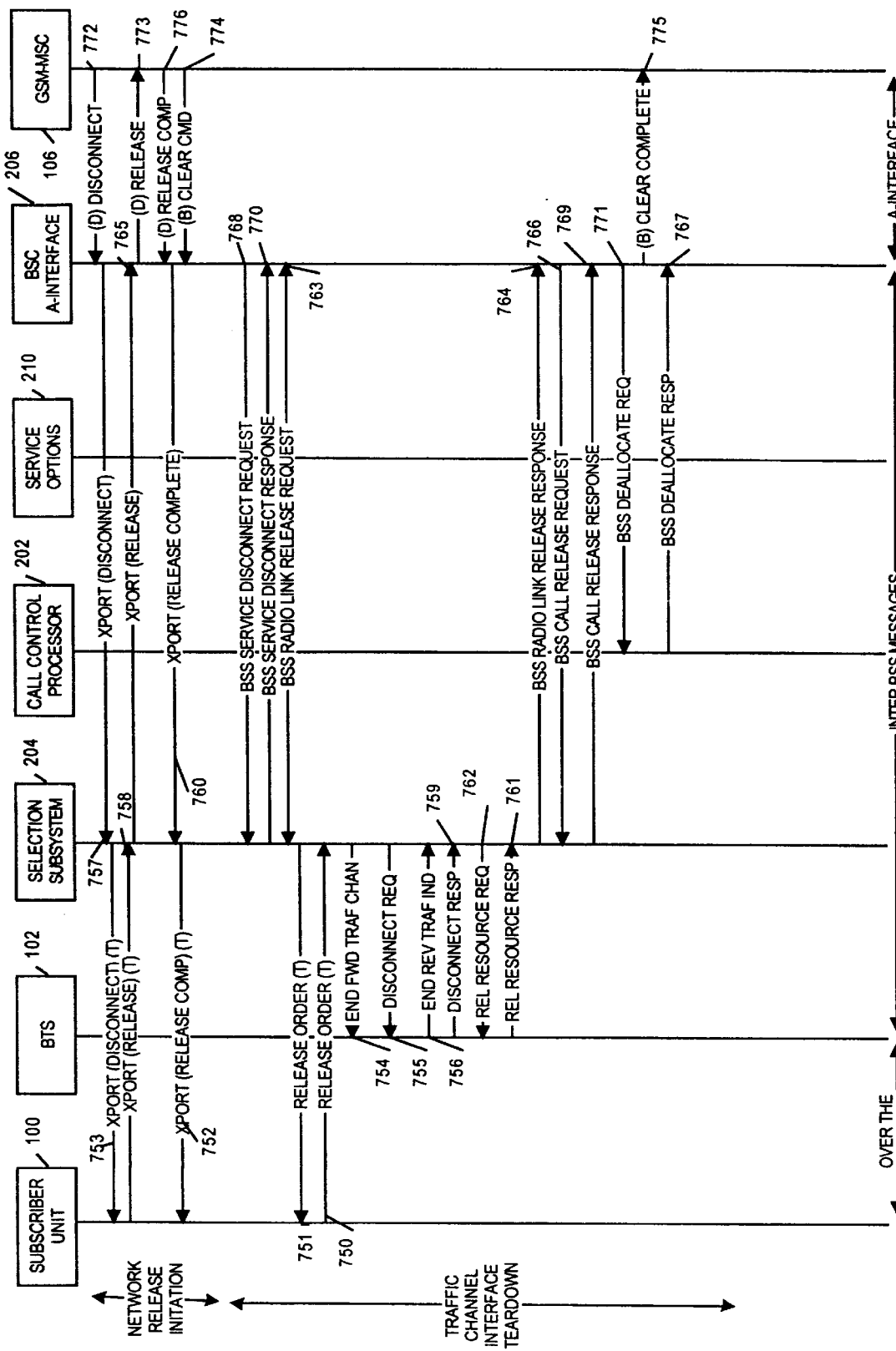
FIG. 9 is a message sequence diagram illustrating the signaling messages transmitted during a network initiated call release performed in accordance with one embodiment of the invention.

In FIGS. 8 and 9, "network release initiation," indicated on the far left of the figures, is the process of beginning the teardown and release of the network resources involved in the telephone call. Also in FIGS. 8 and 9, "traffic channel interface teardown" is the process of releasing the resources associated with the bi-directional radio frequency signal interface between subscriber unit 100 and BSS 105 (FIG. 3). It should also be noted that the message sequence diagram shown in FIGS. 6–10 do not show every message transmitted, but only those particularly relevant to the present invention. Some signaling messages discussed below are also not shown for ease of drawing. Additionally, each signaling message shown that is transmitted within BSS 105 is exchanged in accordance with the internal packet based protocol described above, and therefore passes through CDMA interconnect subsystem 200 of FIG. 5 in the preferred embodiment of the invention.

Figure 6:
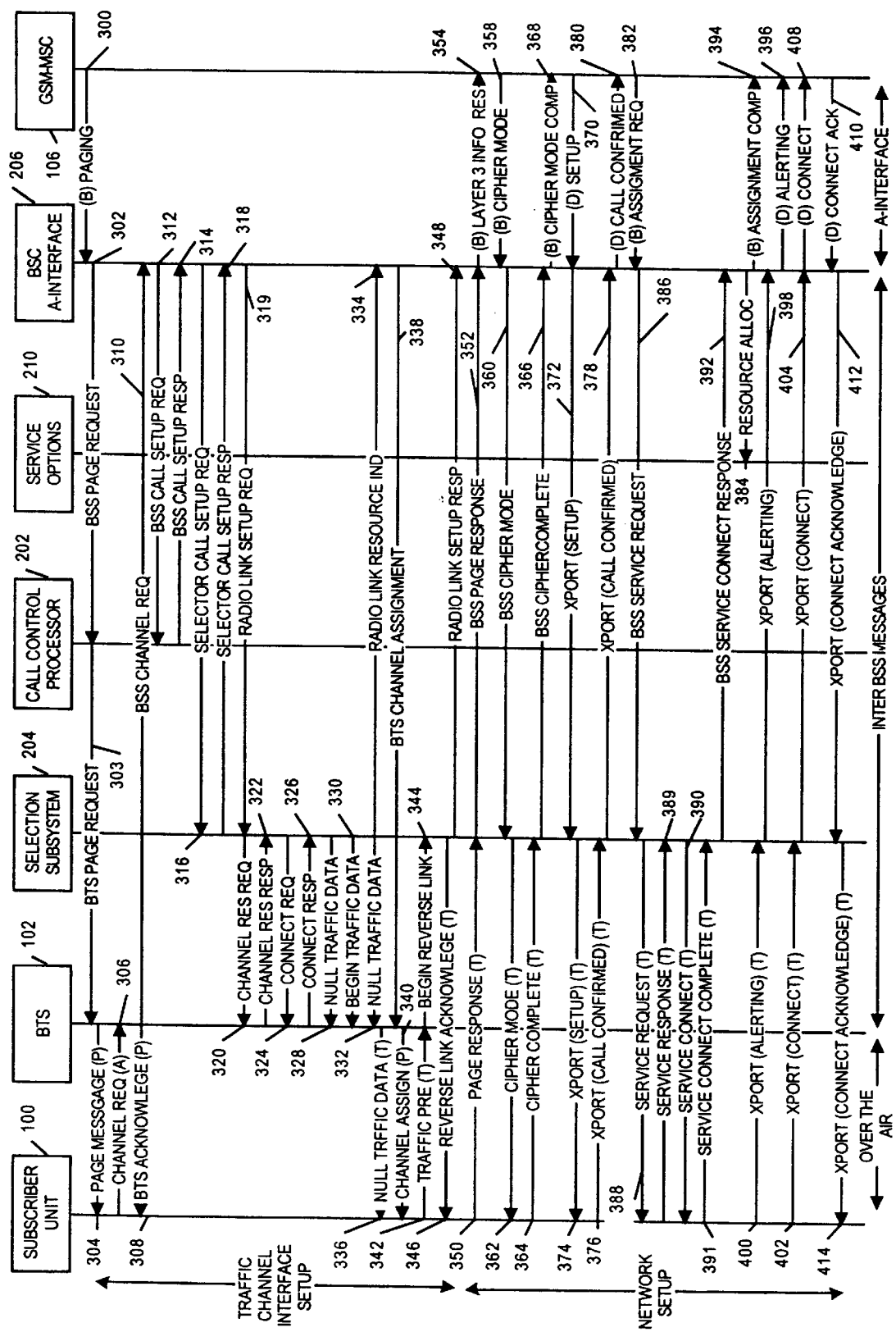
FIG. 6 is a message sequence diagram illustrating the signaling messages transmitted during a subscriber unit terminated call initiation performed in accordance with one embodiment of the invention.

FIG. 6 is a message sequence diagram of a subscriber unit terminated call initiation procedure performed in accordance with one embodiment of the invention. A subscriber unit terminated call initiation procedure results from the initiation of a telephone call or communication by a telecommunications entity other than a subscriber unit 100 interfacing with the wireless telecommunications system shown in FIG. 4, such as a subscriber unit of PSTN 108, a wireless subscriber unit 100 interfacing with another wireless telecommunications systems, or even a data terminal. The subscriber unit terminated call initiation begins when GSM MSC 106 transmits paging message 300 to BSC A-interface 206 in accordance with the A-interface protocol. In accordance with the A-interface protocol, page message 300 indicates the subscriber being paged, identified by the international mobile subscriber identity, the type of channel required on the over-the-air interface, a cell identifier list which indicates the set of cells most recently associated with the subscriber unit, and, if available, the temporary mobile subscriber identity. BSC A-interface 206 first examines the received page message 300 to determine if it is a BSSMAP message.

After identifying page message 300 as a BSSMAP message, BSC A-interface 206 determines that page message 300 is a page message by examining the BSSMAP message type field. Upon determining that page message 300 is a page message, BSC A-interface 206 proceeds to generate a set of signaling messages for establishing a bi-directional CDMA modulated RF channel between BTS 102 and the subscriber unit 100 to which page message 300 is directed. In the preferred embodiment of the invention, this set of signaling messages begins with the transmission of BSS page request 302, which includes the cell identifier list, to call control processor 202. Call control processor 202 responds by transmitting BTS page request 303 to a set of BTSs 102 indicated by the cell identifier list. Each BTS 102 responds by broadcasting page message 304 to the associated cell via the forward link paging channel. If the page is received by subscriber unit 100, it responds by transmitting channel request message 306 to a BTS 102 via the reverse link access channel. Channel request message 306 may contain information about the type of service requested for the call, if such information is included in page message 304.

BTS 102 responds to channel request 306 by transmitting BSS channel request 310 to BSC A-interface 206, and by transmitting BTS acknowledge message 308 to subscriber unit 100 via the paging channel. The transmission of BTS acknowledge message 308 is optional in the preferred embodiment of the invention. BSC A-interface 206 continues to establish the bi-directional user traffic channel interface by responding to BSS channel request 310 with the transmission of BSS call setup request 312 to call control processor 202. Call control processor 202 allocates selector and service resources for the call and indicates the result of the allocation to BSC A-interface 206 in BSS call setup response 314. Upon receiving BSS call setup response 314, BSC A-interface 206 transmits selector call setup request 316 to selection subsystem 204. Selection subsystem 204 initializes the selector resource assigned to process the call and indicates this to BSC A-interface 206 with selector call setup response 318. Upon receipt of selector call setup response 318, BSC A-interface 206 transmits radio link setup request 319 to selection subsystem 204. Selection subsystem 204 responds by transmitting channel resource request 320 to BTS 102.

Upon receipt of channel resource request 320, BTS 102 allocates channel processing resources to modulate and demodulate the forward and reverse link user traffic channels associated with the telephone call, and transmits channel resource response message 322 to selection subsystem 204. Selection subsystem 204 responds by transmitting connect request 324 to BTS 102 which responds by transmitting connect response 326 to selection subsystem 204. Selection subsystem 204 then transmits null traffic data 328, begin traffic data message 330, and null traffic data 332 to BTS 102. BTS 102 responds to begin traffic data message 330 and null traffic data 332 by transmitting null traffic data 336 to subscriber unit 100 via the forward link user traffic channel. Selection subsystem 204 also transmits radio link resource indication 334 to BSC A-interface 206. Upon receipt of radio link resource indication 334, BSC A-interface 206 transmits BTS channel assignment message 338 to BTS 102 which responds by transmitting channel assignment message 340 to subscriber unit 100 via the forward link paging channel. Subscriber unit 100 uses the assigned channel information contained in channel assignment message 340 to begin processing the assigned forward link traffic channel, and it transmits reverse link traffic channel preamble 342 on the reverse link user traffic channel so that BTS 102 can acquire the reverse link traffic channel from subscriber unit 100. Once the reverse link traffic channel has been acquired, BTS 102 transmits begin reverse link message 344 to selection subsystem 204. Selection subsystem 204 responds by transmitting reverse link acknowledge 346 to subscriber unit 100 via the forward link traffic channel. Additionally, selection subsystem 204 transmits radio link setup response message 348 to BSC A-interface 206. Upon receipt of reverse link acknowledge 346, the bi-directional RF interface has been established.

Having established forward and reverse link traffic channel interfaces with BTS 102, subscriber unit 100 initiates a telecommunications network connection establishment procedure by transmitting page response 350 to selector subsystem 204. Page response 350 causes selector subsystem 204 to transmit BSS page response 352 to BSC A-interface 206. BSC A-interface 206 receives BSS page response 352, which indicates subscriber unit 100 is prepared to establish a network connection, stores the classmark information of subscriber unit 100, and initiates an SCCP connection by sending an SCCP connection request containing complete layer 3 information message 354 to GSM MSC 106 in accordance with the A-interface protocol. Complete layer 3 information message 354 contains the contents of BSS page response message 352 and is part of the GSM A-interface protocol and therefore well known in the art. GSM MSC 106 responds by transmitting cipher mode command 358 to BSC A-interface 206. Cipher mode command 358 contains encryption information including a ciphering key, the list of possible encryption algorithms to use based on the capabilities of subscriber unit 100, and the cipher response mode which may request the international mobile equipment identity.

Upon determining that cipher mode command 358 is a BSSMAP message and then further determining it is a cipher mode command, BSC A-interface 206 selects one of the possible encryption algorithms and transmits BSS cipher mode command 360 to selector subsystem 204. Selection subsystem 204 initiates over-the-air encryption procedures by transmitting cipher mode command 362 to subscriber unit 100 via the forward link traffic channel. After processing cipher mode command 362, subscriber unit 100 transmits cipher mode complete message 364 via the reverse link traffic channel to selection subsystem 204. Upon receiving cipher mode complete message 364, selection subsystem 204 begins to perform encryption-decryption on all additional signaling and call data associated with the telephone call by changing to a private reverse link channel code, or long code, substantially in accordance with the IS-95 standard. It should be noted that other methods of ciphering and encryption are consistent with the operation of the present invention. Selection subsystem 204 then transmits BSS cipher mode complete message 366 to BSC A-interface 206 indicating the cipher mode configuration operation has been completed. BSC A-interface 206 responds by transmitting cipher mode complete command 368 indicating the chosen encryption algorithm and the international mobile equipment identifier, if requested, to GSM MSC 106 in accordance with the A-interface protocol.

Next, GSM MSC 106 transmits setup message 370 to BSC A-interface 206. Setup message 370 contains various types of information about the telephone call being established including the type of service, the rate of transmission, the type of data being transmitted, and the type of voice encoding. The use of setup message 370 is part of the GSM A-interface protocol and therefore well known in the art. Upon determining setup message 370 is a DTAP message, BSC A-interface 206 transparently transports the message contents via transport message 372 to selection subsystem 204. In the preferred embodiment of the invention, BSC A-interface 206 does not know setup message 370 is in fact setup message, but only that it is a DTAP type message as it does not look beyond the discriminator bits, This simplifies the processing required of BSC A-interface 206 and allows for transparent transport. Upon determining transport message 372 is a transport message, selection subsystem 204 forwards the message contents via transport message 374 to subscriber unit 100 via the forward link traffic channel. After receiving transport message 374, subscriber unit 100 passes the contents of the message, which is the DTAP setup message, to the GSM message processing portion of subscriber unit 100. That portion of subscriber unit 100 responds by transmitting call confirm to selection subsystem 204 within transport message 376. A call confirm either confirms the type of service set forth in setup message 370, or proposes an alternative type of service. Selection subsystem 204 transparently transports the contents of transport message 376 to BSC A-interface 206 via transport message 378 containing the call confirm. Continuing the transparent transport processes, BSC A-interface 206 forwards the message contents via DTAP call confirm message 380 to GSM MSC 106 in accordance with the GSM A-interface protocol.

Upon receipt of call confirm message 380 GSM MSC 106 transmits assignment request 382 to BSC A-interface 206. Assignment request 382 indicates the channel type, priority, circuit identity code (network timeslot), downlink DTX flag (variable rate transmission), interference band (frequency hopping) to be used, and classmark information 2 (type of subscriber unit). The channel type is the type of data that is to be transmitted during the transmission, for example fax, voice, or signaling. Assignment request 382, a BSSMAP message, causes BSC A-interface 206 to negotiate the type of CDMA service necessary to process the telephone call with subscriber unit 100. This negotiation begins with the transmission of BSS service request 386 to selection subsystem 204, which responds by transmitting service request 388 to subscriber unit 100 via the forward link traffic channel. Service request 388 indicates the parameters of the radio link necessary in order to provide the requested data service including the data rate, and subscriber unit 100 responds by transmitting service response 389 to selector subsystem 100, which indicates whether that type of radio link is acceptable. If service response 389 indicates the type of service is acceptable, selector subsystem 204 transmits service connect message 390 to subscriber unit 100 via the forward link traffic channel, which causes subscriber unit 100 to transmit service connect complete message 391 to selection subsystem 204 via the reverse link traffic channel.

Selector subsystem 204 then indicates the successful service negotiation to BSC A-interface 206 by transmitting BSS service response 392. Upon receiving BSS service response 392, BSC A-interface 206 allocates resources for processing the call in accordance with the type of service via the transmission of BSS resource allocation message 384 to data processing and service options system 210. Data processing and service options system 210 then allocates call processing resources for processing any traffic data received. In an alternative embodiment of the invention, the service options resource allocation is performed in response to the channel request message 310. Additionally, BSC A-interface 206 allocates a connection within switch 212 to create a traffic channel between GSM MSC 106 and data processing and service options system 210 to carry the traffic data associated with the call. (Message to switch 212 not shown) BSC A-interface 206 then indicates the service negotiation has been completed via transmission of assignment complete message 394 to GSM MSC in accordance with the GSM A-interface protocol.

Upon completion of the service negotiation, the GSM message processing portion of subscriber unit 100 indicates to GSM MSC 106 that it is alerting the user of subscriber unit 100 by transmitting an alerting message via transport message 400. The alerting message is transparently transported by selector subsystem 204 to BSC A-interface via transport message 398, and then to GSM MSC 106 by BSC A-interface via DTAP alerting message 396. At this point, GSM MSC 106 may generate the ringback tone towards the calling party. If the call is answered by subscriber unit 100, it indicates the answer event to GSM MSC 106 by transmitting a connect within transport message 402 to selection subsystem 204 via the reverse link traffic channel. The connect is transparently transported by selector subsystem 204 to BSC A-interface via transport message 404, and then to GSM MSC 106 by BSC A-interface via DTAP connect message 408. Upon receipt of connect message 408, GSM MSC ceases the ring back if provided, and transmits connect acknowledge message 410 to BSC A-interface 206. BSC A-interface 206 transparently forwards connect acknowledge message 410 to selection subsystem 204 via transport message 412. Selection subsystem 204 then continues the transparent transport via the transmission of transport message 414 to subscriber unit 100 via the forward link traffic channel. Upon receipt of transport message 414 by subscriber unit 100, a stable call state has been established and the subscriber unit terminated call origination process is completed.

FIG. 7 is a message sequence diagram illustrating the signaling messages transmitted during a subscriber unit originated call initiation procedure performed in accordance with one embodiment of the invention. A wireless subscriber unit originated call initiation procedure results from a telephone call initiated by a subscriber unit 100 of FIG. 2. The subscriber unit originated call initiation procedure begins with channel request message 506 transmitted from subscriber unit 100 to BTS 102 via the reverse link access channel. In the preferred embodiment of the invention, channel request message 506 contains information about the type of service being requested, however, this information may be provided in other messages in alternative embodiments of the invention. BTS 102 responds to channel request 506 by transmitting BSS channel request 510 to BSC A-interface 206, and by transmitting BTS acknowledge message 508 to subscriber unit 100, although the transmission of BTS acknowledge message 508 is optional in the preferred embodiment of the invention. BSC A-interface 206 responds by generating a set of signaling messages for establishing a bi-directional CDMA modulated RF signal interface between subscriber unit 100 and BTS 102. The process of establishing such a bi-directional interface begins when BSC A-interface 206 transmits BSS call setup request 512 to call control processor 202. Call control processor 202 allocates selector and service resources for the call and indicates the result of the allocation to BSC A-interface 206 in BSS call setup response 514. Upon receiving BSS call setup response 514, BSC A-interface 206 transmits selector call setup request 516 to selection subsystem 204. Selection subsystem 204 initializes the selector resource assigned and indicates this to BSC A-interface 206 with selector call setup response 518. Upon receipt of call setup response 518, BSC A-interface 206 transmits radio link setup request 519 to selection subsystem 204. Selection subsystem 204 responds by transmitting channel resource request 520 to BTS 102.

Upon receipt of channel resource request 520, BTS 102 allocates channel processing resources to modulate and demodulate the forward and reverse link user traffic channels associated with the telephone call, and transmits channel resource response message 522 to selection subsystem 204. Selection subsystem 204 responds by allocating a selection resource for processing the call, and by transmitting connect request 524 to BTS 102, which responds by transmitting connect response 526 to selection subsystem 204. Selection subsystem 204 then transmits null traffic data 528, traffic data message 530, and null traffic data 532 to BTS 102. BTS 102 responds to begin traffic data message 530 and null traffic data 532 by transmitting null traffic data 536 to subscriber unit 100 via the forward link traffic channel. Selection subsystem 204 also transmits radio link resource message 534 to BSC A-interface 206. Upon receipt of radio link resource message 530, BSC A-interface 206 transmits BTS channel assignment message 538 to BTS 102 which responds by transmitting channel assignment message 540 to subscriber unit 100 via the forward link paging channel.

Subscriber unit 100 uses the assigned channel information contained in channel assignment message 540 to begin processing the data received via the assigned forward link traffic channel. It also transmits reverse link traffic channel preamble 542 so BTS 102 can acquire the reverse link traffic channel from subscriber unit 100. Once the reverse link signal has been acquired, BTS 102 transmits begin reverse link message 544 to selection subsystem 204. Selection subsystem 204 responds by transmitting reverse link acknowledge 546 to subscriber unit 100 via the forward link traffic channel. Additionally, selection subsystem 204 transmits radio link resource message 548 to BSC A-interface 206. At this point, the bi-directional link has been established and network connection setup begins.

Upon receipt of reverse link acknowledge message 546, subscriber unit 100 initiates network connection setup by transmitting call management service request 550 to selection subsystem 204 via the reverse link traffic channel. Selection subsystem 204 responds by transmitting BSS call management service request 551 to BSC A-interface 206. BSC A-interface 206 stores the classmark information contained in the message, generates complete layer three information message 552 containing the information sent in BSS call management service request 551, and initiates an SCCP connection by sending complete layer three information message 552 inside an SCCP connection request message to GSM MSC 106 in accordance with the A-interface protocol. Complete layer three information message 552 is part of the GSM A-interface protocol and therefore well known in the art.

GSM MSC 106 responds by transmitting authentication request 553 to BSC A-interface 206. BSC A-interface 206 identifies message 553 as a DTAP message, and it transparently forwards the contents of the message to selection subsystem 204 via transport message 554. Selection subsystem 204 determines transport message 554 is of a transport message type and transparently forwards the contents of the message to subscriber unit 100 by transmitting transport message 555 via the forward link traffic channel. Subscriber unit 100 receives transport message 555 and transports the contents to an internal GSM message processing portion which responds by transmitting transport message 556 containing an authentication response to selector subsystem 204 via the reverse link traffic channel. Upon determining the transport message 556 is a transport message, selection subsystem 204 transparently forwards the contents of the message to BSC A-interface 206 via transport message 557. BSC A-interface 206 continues the transparent transport by forwarding DTAP authentication response 558 to GSM MSC 106 in accordance with the GSM A-interface protocol.

GSM MSC 106 responds by transmitting cipher mode command 559 to BSC A-interface 206. Upon determining that message 559 is a BSSMAP message and then further determining it is a cipher mode command, BSC A-interface 206 begins over-the-air encryption initiation procedures by transmitting BSS cipher mode command 560 to selection subsystem 204. Upon receiving BSS cipher mode command 560, selection subsystem 204 transmits cipher mode command 562 to subscriber unit 100 via the forward link traffic channel. After processing cipher mode command 562, subscriber unit 100 transmits cipher mode complete message 564 via the reverse link traffic channel to selection subsystem 204 and begins to encrypt all subsequent transmissions. Upon receipt of cipher mode complete message 564, selector subsystem 204 begins to perform encryption-decryption on all additional signaling and call data associated with the telephone call. In the preferred embodiment of the invention, this encryption is performed via the use of private channel codes in accordance with the IS-95 specification; however, the use of alternative encryption methods is consistent with the operation of the present invention. Selection subsystem 204 then transmits BSS cipher mode complete message 566 to BSC A-interface 206. BSC A-interface 206 responds by transmitting cipher mode complete command 568 to GSM MSC 106 in accordance with the GSM A-interface protocol indicating the configuration for encryption is complete.

Having a secure bi-directional channel established, subscriber unit 100 transmits setup information to GSM MSC 106 by transmitting setup message 570 to selection subsystem 204. Setup message 570 contains various types of information about the telephone call being established including the dialed digits, type of service, the rate of transmission, the type of data being transmitted, and the type of voice encoding. Selection subsystem 204 transparently forwards the setup message via transport message 572 to BSC A-interface 206. BSC A-interface 206 continues the transparent transport of the setup message by transmitting transport message 574 to GSM MSC 106 in accordance with the GSM A-interface protocol. After receiving transport message 572 and initiating the connection to the called party, GSM MSC 106 transmits transport message 576 containing a call proceeding message to BSC A-interface 206. A Call proceeding messages indicates that the network connection is being established, and that no more call establishment information will be accepted. BSC A-interface 206 responds by transparently transmitting the call proceeding message within transport message 578 to selection subsystem 204. Selection subsystem 204 responds by transmitting transport message 580 containing the call proceeding message to subscriber unit 100 via the forward link traffic channel.

After transmitting call proceeding message 576, GSM MSC 106 also transmits assignment request 582 to BSC A-interface 206. In response, BSC A-interface 206 continues to configure the BSS for processing the call by transmitting BSS assignment request 586 to selection subsystem 204, which responds by transmitting service connect 589 to subscriber unit 100 via the forward link traffic channel. In response, subscriber unit 100 transmits service connect complete message 591 to selection subsystem 204 via the reverse link traffic channel indicating the type of service is acceptable. (Note, the use of a both a service request message and a service response message as shown in FIG. 4 is omitted here because it is highly likely that the service will be acceptable to subscriber unit 100 because subscriber unit 100 made the initial service request when initiating the telephone call.) Selection subsystem 204 proceeds to transmit BSS service response 592 to BSC A-interface 206 and BSC A-interface 206 responds by transmitting assignment complete message 594 to GSM MSC in accordance with the GSM A-interface protocol. To allocate resources for processing the call in accordance with the type of service indicated in assignment request 582 and BSS service response 592, BSC A-interface 206 also transmits resource allocation message 584 to data processing and service options system 210. Additionally, BSC A-interface 206 allocates a connection within switch 212 (FIG. 3) to create a traffic channel between GSM MSC 106 and data processing and service options system 210 to carry the traffic data associated with the call. (Message to switch 212 not shown)

Upon receipt of assignment complete message 594, GSM MSC 106 transmits alerting message 596 to BSC A-interface 206 in accordance with the GSM A-interface protocol, which responds by transparently forwarding the message to selection subsystem 204 via transport message 598 which contains the alerting message. Selection subsystem 204 then continues the transparent transport by transmitting transport message 600 containing the alerting message to subscriber unit 100 via the forward link traffic channel. The alerting message indicates that subscriber unit 100 should start to generate the ring back tone. If the call is answered, GSM MSC 106 transmits connect message 602 to BSC A-interface 206 in accordance with the A-interface protocol, and BSC A-interface 206 responds by transmitting transport message 604 containing the connect message to selection subsystem 204. Selection subsystem 204 then continues to transparently forward the connect message to subscriber unit 100 by transmitting transport message 606 via the forward link traffic channel. Upon receipt of transport message 606, subscriber unit 100 ceases generation of the ring back tone, and transmits transport message 610 containing a connect acknowledge to selection subsystem 204. Selection subsystem 204 responds by transparently forwarding the connect acknowledge to BSC A-interface 206 via transport message 612, which then transmits connect acknowledge message 614 to GSM MSC 106 in accordance with the GSM A-interface protocol. Upon receipt of connect acknowledge message 614 by GSM MSC 106, a steady state call has been established.

FIG. 8 is a message sequence diagram illustrating the signaling messages exchanged during subscriber unit originated call release performed in accordance with one embodiment of the invention. A subscriber unit initiated call release is the disconnection of a telephone call in response to a release request by subscriber unit 100 of FIG. 2. The subscriber unit originated call release begins during an ongoing telephone call or other communication by tearing down the network connection when subscriber unit 100 transmits transport message 652 containing a disconnect message to selection subsystem 204 via the reverse link traffic channel. Selection subsystem 204 responds by forwarding the disconnect message via transport message 657 to BSC A-interface 206 causing BSC A-interface 206 to transmit disconnect message 672 to GSM MSC 106 in accordance with the A-interface protocol. GSM MSC 106 initiates the release of the network connection to the other party and transmits release message 673 to BSC A-interface 206. In response, BSC A-interface 206 transmits transport message 665 containing the release to selection subsystem 204. Selection subsystem 204 then forwards the release via transmission of transport message 658 to subscriber unit 100 via the forward link traffic channel.

Subscriber unit 100 responds by transmitting transport message 653 containing a release complete to selection subsystem 204 via the reverse link traffic channel. Selection subsystem 204 forwards the release complete via transmission of transport message 660 to BSC A-interface 206. BSC A-interface responds by forwarding release complete message 676 to GSM MSC 106 in accordance with the GSM A-interface protocol. GSM MSC 106 responds with clear command 674 to BSC A-interface 206, in accordance with the GSM A-interface protocol, which indicates the bi-directional radio link should be released as well as all A-interface network resources.

Upon receipt of clear command 674, BSC A-interface 206 generates a set of messages for causing traffic channel interface teardown. The traffic channel interface teardown begins when BSC A-interface 206 transmits BSS service disconnect message 668 to selection subsystem 204. Additionally, BSC A-interface 206 instructs switch 212 to eliminate the traffic channel connection between data processing and service options system 210 and GSM MSC 106. (Message not shown) Selection subsystem 204 acknowledges the receipt of BSS service disconnect request message 668 by transmitting BSS service disconnect response 670 which causes BSC A-interface 206 to transmit BSS radio link release request 663 to selection subsystem 204. Upon receipt of BSS radio link release request 663, selection subsystem 204 transmits release order 651 to subscriber unit 100 via the forward link traffic channel. Subscriber unit 100 responds by transmitting release order 650 to selection subsystem 204 via the reverse link traffic channel. Selection subsystem 204 then transmits end forward traffic channel command 654 and disconnect request 655 to BTS 102. BTS 102 releases the resources used to process the forward and reverse link traffic channels and then transmits end reverse link traffic channel 656 and disconnect response 659 to selection subsystem 204.

Selection subsystem 204 then transmits release resource request 662 to BTS 102, and BTS 102 responds by transmitting release resource response 661 to selection via the reverse link traffic channel. Upon receipt of release resource response, selection subsystem 204 transmits radio release response 664 to BSC A-interface 206 which responds by transmitting call release request 666 to selection subsystem 204. Selection subsystem 204 then transmits call release response to BSC A-interface 206 and releases the selection resources associated with the telephone call. BSC A-interface 206 then transmits deallocate request 671 to call control processor 202 indicating that the selection and service resources associated with the telephone call have been released, and are available for processing other calls. BSC A-interface 206 also indicates that the call has been released to GSM MSC 106 by transmitting clear complete 675 in accordance with the GSM A-interface protocol. Clear complete 675 indicates to GSM MSC 106 that the call processing resources are now available. Call control processor 202 responds to deallocate request 671 by transmitting deallocate response 667 to BSC A-interface 206. Upon receipt of deallocate response 667 by BSC A-interface 206, the call has been released.

FIG. 9 is a message sequence diagram illustrating the signaling messages exchanged during network initiated call release performed in accordance with one embodiment of the invention. A network initiated call release is the disconnection of a telephone call in response to a request originating at a system other than a subscriber unit 100 of FIG. 2. The network initiated call release begins during an ongoing telephone call or other communication. GSM MSC 106 initiates the network teardown by transmitting disconnect message 772 to BSC A-interface 206 in accordance with the GSM A-interface protocol. BSC A-interface 206 responds by forwarding transport message 757 containing the disconnect to selection subsystem 204 which forwards transport message 753 also containing the disconnect to subscriber unit 100 via the forward link traffic channel. Subscriber unit 100 then transmits transport message 758 containing a release message to selection subsystem 204 which forwards transport message 765 containing the release message to BSC A-interface 206 in response. BSC A-interface 206 then transmits release message 773 to GSM MSC 106 in accordance with the GSM A-interface protocol. GSM MSC 106 responds by transmitting release complete message 776 to BSC A-interface 206 in accordance with the GSM A-interface protocol. BSC A-interface 206 forwards transport message 760 containing a release complete to selection subsystem 204 which responds by forwarding transport message 752 also containing the release complete to subscriber unit 100 via the forward link traffic channel.

GSM MSC 106 requests the release of the bi-directional radio link with the transmission of clear command 774 to BSC A-interface 206 in accordance with the GSM A-interface protocol. Upon receipt of clear command 774, BSC A-interface 206 begins traffic channel interface teardown substantially in accordance with the IS-95 call model. The traffic channel interface teardown begins when BSC A-interface 206 transmits BSS service disconnect message request 768 to selection subsystem 204. Additionally, BSC A-interface 206 instructs switch 212 to release the traffic channel connection between data processing and service options system 210 and GSM MSC 106. (Message not shown) Selection subsystem 204 acknowledges the receipt of BSS service disconnect request message 768 by transmitting BSS service disconnect response 770, which causes BSC A-interface 206 to transmit BSS radio link release request 763 to selection subsystem 204. Upon receipt of BSS radio link release request 763, selection subsystem 204 transmits release order 751 to subscriber unit 100 via the forward link traffic channel. Subscriber unit 100 responds by transmitting release order 750 to selection subsystem 204 via the reverse link traffic channel. Selection subsystem 204 then transmits end forward traffic channel command 754 and disconnect request 755 to BTS 102. BTS 102 releases the resources used to process the forward and reverse link traffic channels and then transmits end reverse link traffic channel 756 and disconnect response 759 to selection subsystem 204.

Selection subsystem 204 then transmits release resource request 762 to BTS 102, and BTS 102 responds by transmitting release resource response 761 to selection via the reverse link traffic channel. Upon receipt of release resource response, selection subsystem 204 transmits BSS radio link release response 764 to BSC A-interface 206 which responds by transmitting BSS call release request 766 to selection subsystem 204. Selection subsystem 204 then transmits BSS call release response 769 to BSC A-interface 206, and releases the selection resources associated with the telephone call being released. BSC A-interface 206 then transmits BSS deallocate request 771 to call control processor 202 indicating that the selection and service resources associated with the telephone call have been released and are available for processing other calls. BSC A-interface 206 also indicates that the call has been released to GSM MSC 106 by transmitting clear complete 775 in accordance with the GSM A-interface protocol. BSC A-interface responds to BSS deallocate request 771 by transmitting BSS deallocate response 767 to BSC A-interface 206. Upon receipt of BSS deallocate response 767 by BSC A-interface 206, the call has been released.

Figure 10B:
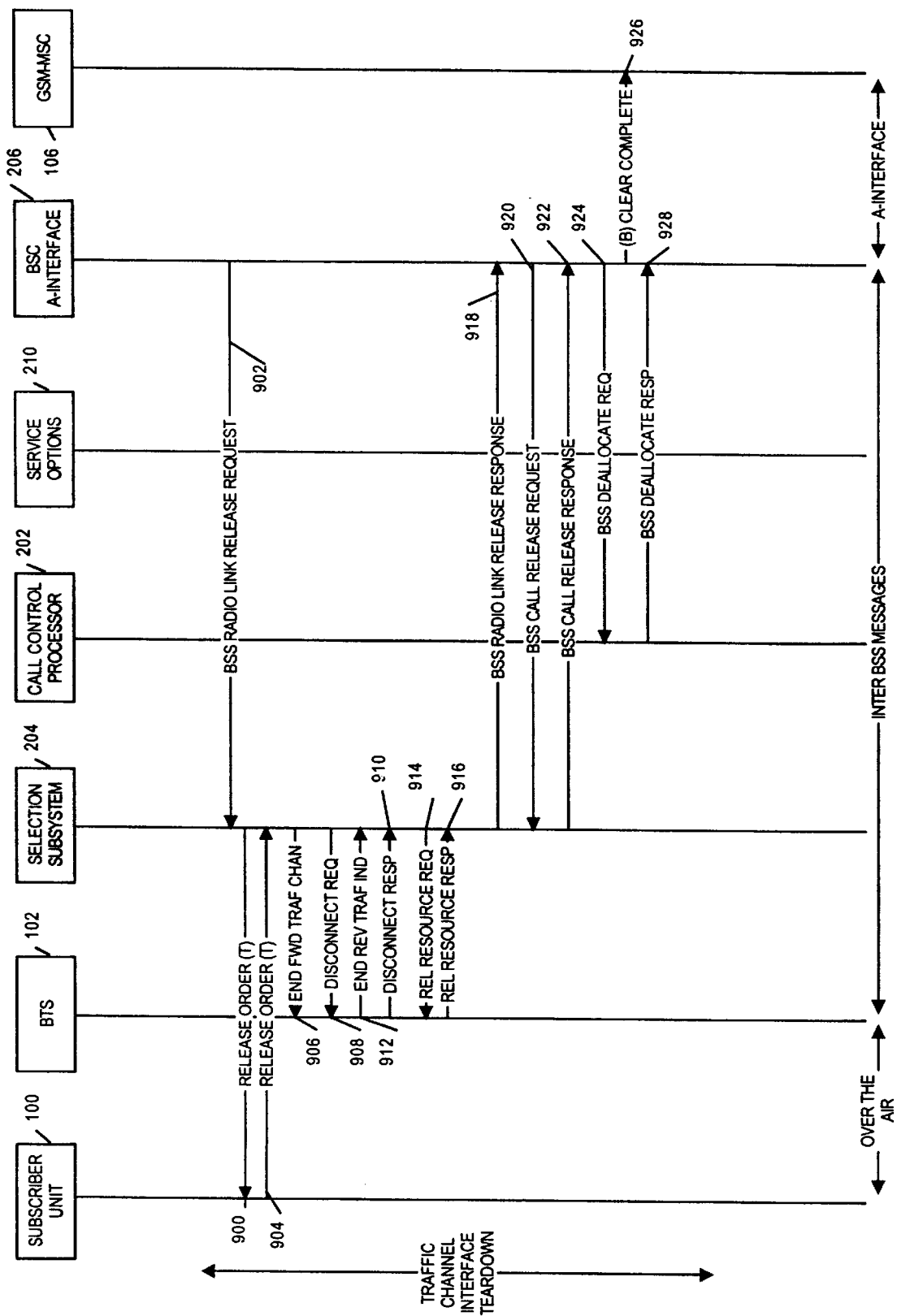

FIGS. 10A and 10B show a message sequence diagram illustrating the signaling messages exchanged during a subscriber unit registration performed in accordance with one embodiment of the invention. During a subscriber unit registration, a subscriber unit 100 of FIG. 2 notifies GSM MSC 106 of its present location and status so that GSM MSC 106 may provide service to that subscriber unit 100. The subscriber unit registration begins with channel request message 806 transmitted from subscriber unit 100 to BTS 102 via the reverse link access channel. In the preferred embodiment of the invention, channel request message 806 indicates that subscriber 100 is initiating a registration, however, this information may be provided in other messages in alternative embodiments of the invention. BTS 102 responds to channel request 806 by transmitting BSS channel request 810 to BSC A-interface 206 and BTS acknowledge message 808 to subscriber unit 100, although the transmission of BTS acknowledge message 808 is optional in the preferred embodiment of the invention. BSC A-interface 206 responds by generating a set of messages to establish a bi-directional CDMA modulated RF signal interface between subscriber unit 100 and BTS 102 by transmitting BSS call setup request 812 to call control processor 202. Call control process 202 allocates a selector and service for the call and indicates the result to BSC A-interface 206 in BSS call setup response 814. Upon receiving BSS call setup response 814, BSC A-interface 206 transmits selector call setup request 816 to selection subsystem 204. Selector subsystem 204 responds by allocating a selection resource for processing the telephone call, and by indicating such to BSC A-interface 206 with selector call setup response 818. Upon receipt of call setup response 818, BSC A-interface 206 transmits radio link setup request 819 to selection subsystem 204. Selection subsystem 204 responds by transmitting channel resource request 820 to BTS 102.

Upon receipt of channel resource request 820, BTS 102 allocates channel processing resources to modulate and demodulates the forward and reverse link traffic channels associated with the telephone call and transmits channel resource response message 822 to selection subsystem 204. Selection subsystem 204 responds by transmitting connect request 824 to BTS 102 which responds by transmitting connect response 826 to selection subsystem 204. Selection subsystem 204 then transmits null traffic data 828, begin traffic data message 830, and null traffic data 832 to BTS 102. BTS 102 responds to begin traffic data message 830 and null traffic data 832 by transmitting null traffic data 836 to subscriber unit 100 via the forward link traffic channel.

Selection subsystem 204 also transmits radio link resource message 834 to BSC A-interface 206. Upon receipt of radio link resource message 834, BSC A-interface 206 transmits BTS channel assignment message 838 to BTS 102 which responds by transmitting channel assignment message 840 to subscriber unit 100 via the forward link paging channel. Subscriber unit 100 uses the assigned channel information contained in channel assignment message 840 to being processing the data received via the assigned forward link traffic channel, and it transmits reverse link traffic channel preamble 842 so that BTS 102 can acquire the reverse link traffic channel. Once the reverse link signal has been acquired, BTS 102 transmits begin reverse link message 844 to selection subsystem 204. Selection subsystem 204 responds by transmitting reverse link acknowledge 846 to subscriber unit 100 via the forward link traffic channel. As noted above, messages such as reverse link acknowledge 846 exchanged between selection subsystem 204 and subscriber unit 100 pass through BTS 102, but are shown as routed directly for ease of drawing. Additionally, selection subsystem 204 transmits radio link setup response 848 to BSC A-interface 206. At this point, a bi-directional channel is established.

Subscriber unit 100 initiates the registration procedure by transmitting DTAP location update request 850 to selection subsystem 204. Selection subsystem 204 routes the location update request to BSC A-interface 206 which initiates an SCCP connection with GSM MSC 106 as specified in the GSM A interface protocol. After storing the classmark information, BSC A-interface 206 generates an SCCP connection request message containing complete layer three information message 852 which contains BSS location request 851. Complete layer three information message 852 is part of the GSM A-interface protocol and therefore well known in the art. GSM MSC 106 responds by transmitting authentication request 853 to BSC A-interface 206 which in turn forwards transport message 854 containing the authentication request to selection subsystem 204. Selection subsystem then forwards transport message 855 containing the authentication request to subscriber unit 100 via the forward link traffic channel. Subscriber unit 100 passes the transported authentication request to its GSM based message processing portion which responds to authentication request 855 by transmitting transport authentication response 856 to selector subsystem 204 via the reverse link traffic channel. Selection subsystem 204 transparently forwards the authentication response by transmitting transport message 857 to BSC A-interface 206. BSC A-interface 206 then transmits authentication response 858 to GSM MSC 106 in accordance with the GSM A-interface protocol. GSM MSC 106 responds by transmitting cipher mode command 859 to BSC A-interface 206. BSC A-interface 206 then begins encryption initiation procedures by transmitting BSS cipher mode command 860 to selection subsystem 204 which transmits cipher mode command 862 to subscriber unit 100 via the forward link traffic channel. After processing cipher mode command 862, subscriber unit 100 transmits cipher mode complete message 864 in encrypted form via the reverse link traffic channel to selection subsystem 204. Upon receiving BSS cipher mode command 860, selection subsystem 204 begins to perform encryption-decryption on all additional signaling and call data associated with the telephone call. Selection subsystem 204 then transmits BSS cipher mode complete message 866 to BSC A-interface 206. BSC A-interface 206 responds by transmitting cipher mode complete command 868 to GSM MSC 106 in accordance with the GSM A-interface protocol.

GSM MSC 106 then transmits ID request 874 to BSC A-interface 206 in accordance with the GSM A-interface protocol, and BSC A-interface 206 responds by forwarding the ID request via transport message 872 to selection subsystem 204. Selection subsystem 204 then transmits transport message 870 containing the ID request to subscriber unit 100 via the forward link traffic channel. The GSM based message processing portion of subscriber unit 100 responds by generating an ID response and subscriber unit 100 transmits that ID response within transport message 880 to selection subsystem 204 via the reverse link traffic channel. Selection subsystem 204 then forwards the ID response via transmission of transport message 878 to BSC A-interface 206 which responds by forwarding ID response 876 to GSM MSC 106 in accordance with the GSM A-interface protocol. GSM MSC 106 receives ID response 876 and transmits location update accepted 882 to BSC A-interface 206 in accordance with the GSM A-interface protocol. BSC A-interface 206 then transmits transport message 886 containing location update accepted to selection subsystem 204, which responds by forwarding location update accepted to subscriber unit 100 by transmitting transport message 890 via the forward link traffic channel. Subscriber unit 100 responds by transmitting transport message 891 containing a temporary mobile subscriber identity (TMSI) reallocation command to selection subsystem 204, and selection subsystem 204 then transmits transport message 892 containing transport TMSI reallocation command to BSC A-interface 206. BSC A-interface 206 responds by transmitting TMSI reallocation command 894 to GSM MSC 106 in accordance with the GSM A-interface protocol. Upon receipt of TMSI reallocation command 894, GSM MSC 106 transmits clear command 896 to BSC A-interface 206 to initiate the release of the radio link.

Referring now to FIG. 10B, which continues to illustrate the signaling messages exchanged during a subscriber unit registration performed in accordance with one embodiment of the invention, BSC A-interface 206 transmits BSS radio link release request 902 to selection subsystem 204 after receiving clear command 896. Upon receipt of BSS radio link release request 902, selection subsystem 204 transmits release order 900 to subscriber unit 100 via the forward link traffic channel. Subscriber unit 100 responds by transmitting release order 904 to selection subsystem 204 via the reverse link traffic channel. Selection subsystem 204 then transmits end forward traffic channel command 906 and disconnect request 908 to BTS 102. BTS 102 releases the resources used to process the forward and reverse link traffic channels and then transmits end reverse link traffic channel indication 908 and disconnect response 910 to selection subsystem 204. Selection subsystem 204 transmits release resource request 914 to BTS 102, and BTS 102 responds by transmitting release resource response 916. Upon receipt of release resource response 916, selection subsystem 204 transmits BSS radio release response 918 to BSC A-interface 206, which responds by transmitting BSS call release request 920 to selection subsystem 204. Selection subsystem 204 then transmits BSS call release response 922 to BSC A-interface 206, and releases the selection resources associated with the telephone call. BSC A-interface 206 transmits BSS deallocate request 924 to call control processor 202 indicating that the selection and service resources associated with the telephone call have been released and are available for processing other calls. In addition, BSC A-interface 206 indicates the call has been released to GSM MSC 106 by transmitting clear complete 926 in accordance with the GSM A-interface protocol. Call control processor 202 responds to BSS deallocate request 924 by transmitting BSS deallocate response 928 to BSC A-interface 206. When deallocate response 928 is received by BSC A-interface 206, the location update procedure is complete.

By performing call initiation and subscriber unit registration by first establishing a CDMA over-the-air interface between the subscriber unit 100 and BSS 105, and then by establishing a network telecommunications network connection between subscriber unit 100 and GSM MSC 106 via the transmission of signaling messages via those forward and reverse link traffic channels, the use of a wireless telecommunications system utilizing a CDMA over-the-air interface in conjunction with the GSM A-interface protocol is made possible. The ability to provide CDMA over the interface in conjunction with the GSM A-interface network is also made possible via the use of a BSC A-interface that receives GSM A-interface messages, and that examines those GSM A-interface messages and takes various actions in response. These actions include converting the GSM A-interface signaling messaging into an internal BSS protocol, and determining the proper response to each message based on the configuration and capabilities of the CDMA over-the-air interface. The proper responses include allocating signal processing resources in response to an assignment request. The ability to provide CDMA over the interface in conjunction with the GSM A-interface network is also facilitated by the use of a selector element that detects when encryption messages are transmitted and that subsequently begins the encryption process. This allows the encryption feature of the GSM A-interface network to be provided along with the soft handoff feature of the IS-95 over-the-air protocol.

Figure 11:
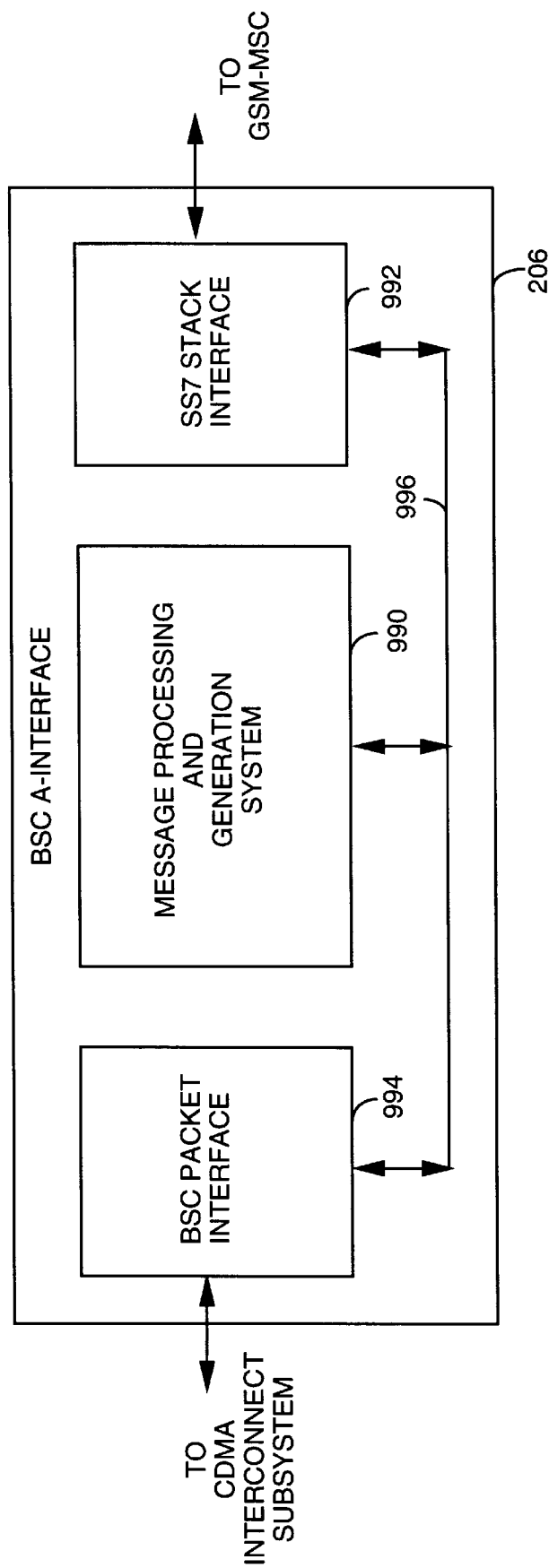
FIG. 11 is a block diagram of BSC A-interface configured in accordance with one embodiment of the invention.

FIG. 11 is a block diagram of BSC A-interface 206 when configured in accordance with one embodiment of the invention. Message processing and generation system 990, SS7 stack interface 992 and BSC packet interface 994 are coupled together via local bus 996. During operation, SS7 stack interface 992 passes signaling messages transmitted in accordance with the GSM A interface with GSM MSC 106. SS7 stack interface 992 also passes the data associated with the signaling messages to message processing and generation system 990. Additionally, message processing and generation system 990 exchanges signaling messages with BSC packet interface 994 via local bus 996. BSC packet interface 994 responds by placing the signaling message data received into BSS network packets, and by extracting signaling message data from BSS network packets and providing that data to message processing and generation system 990. Message processing and generation system 990 performs the various message determination and signaling message generation functions of BSC A-interface 206 as described above in response to the signaling message data received. Message processing and generation system 990, SS7 interface stack 992, and BSC packet interface 994 are each comprised of a semiconductor based microprocessor and a memory storage system in the preferred embodiment of the invention, although a single microprocessor and memory system with sufficient processing power could be used to implement any two or all three of these systems in alternative embodiments of the invention.

Figure 12:
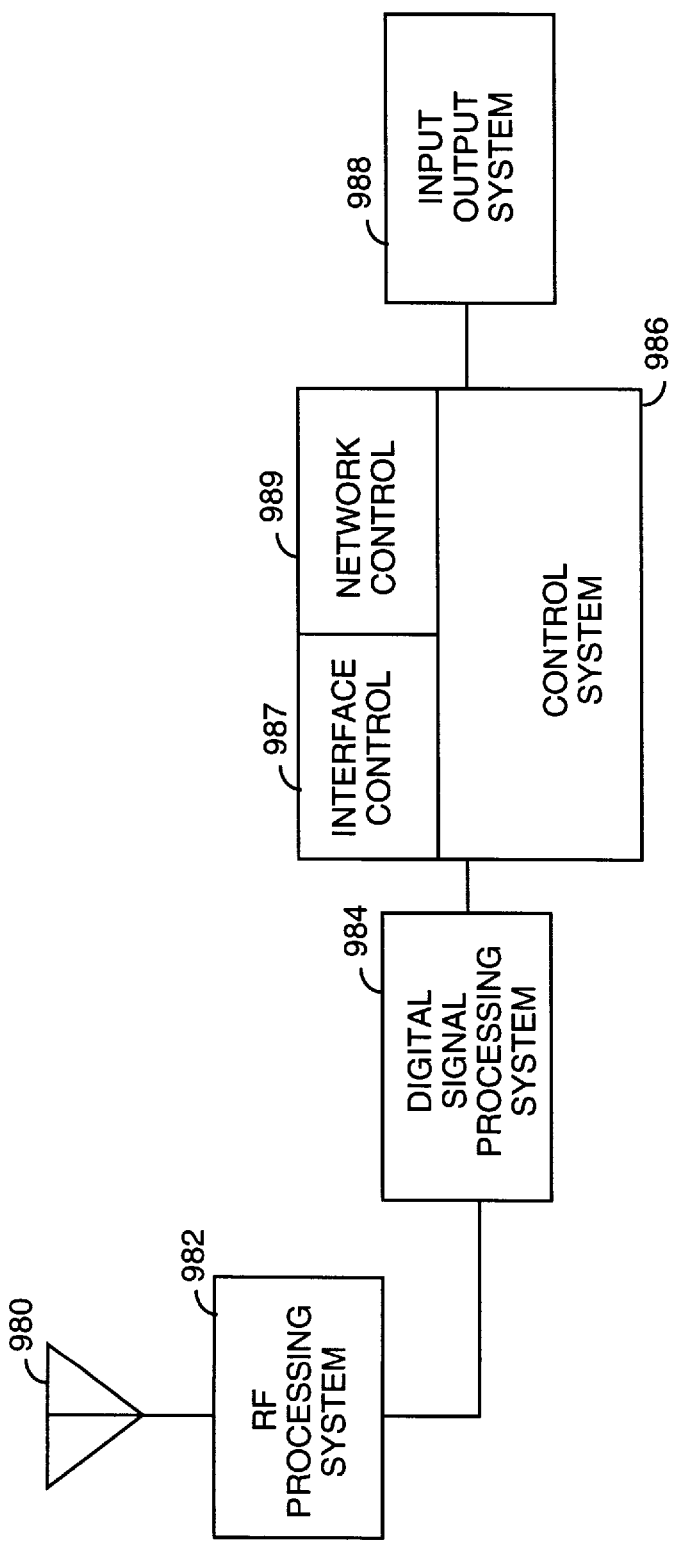
FIG. 12 is a block diagram of a subscriber unit configured in accordance with one embodiment of the invention.

FIG. 12 is a block diagram of a subscriber unit 100 when configured in accordance with one embodiment of the invention. Forward link RF signals transmitted from a BTS 102 (FIG. 3) are received by antenna 980 and passed to RF processing system 982. RF processing system 982 downconverts the signals to baseband and digitizes the baseband signals. Digital signal processing system 984 processes the digitized baseband signals in accordance with the CDMA protocol used to process the signals at transmission. As noted above, the CDMA protocol used in the preferred embodiment of the invention is that associated with the physical signal modulation techniques of the IS-95 protocol, although the use of other CDMA protocols is consistent with the operation of the present invention. The signal processing performed by digital signal processing system 984 includes demodulation with the forward link spreading code and channel code, as well as Viterbi decoding and block deinterleaving, the use of which is well known in the art. This processing is performed on a frame by frame basis. The resulting frames of digital data from digital signal processing system 984 are passed to control system 986. Control system 986 receives the frames of digital data and determines if the digital data is a signaling message or user data based on header information contained in each frame. User data is passed to input output system 988 which normally converts the user data into audio information, but which can also provide the user data in digital format for further processing by other digital systems. Signaling data is assembled into signaling messages which are further categorized by control system 986 into transport signaling messages or local signaling messages via examination of messages header bits.

A non-transport or local signaling message is passed to interface control 987 which processes the message and generates any appropriate response. The appropriate response includes the configuration of digital signal processing system 986 for the reception and transmission of baseband digital signals by providing the necessary spreading and channel codes, as well as the generation of outgoing signaling messages that are transmitted to BTS 102 of FIG. 4 via a non-transport frame in accordance with the various call processing procedures described above. Transport signaling messages are passed to network control 989, which is referred to as the GSM message processing portion of the subscriber unit 100. Network control 989 processes the local signaling message and generates an appropriate response which can include the generation of outgoing signaling messages in accordance with the various call processing procedures described above. Outgoing signaling messages generated by network control 989 are placed into transport messages by control system 986, and are forwarded along with outgoing signaling messages from interface control 987 to digital signal processing system 984 which Viterbi encodes, block interleaves, modulates and spreads the data in accordance with CDMA signal processing techniques. The CDMA processed data is passed to RF signal processing system 982 which generates a quadrature phase shift key (QPSK) reverse link RF signal using the digital data in accordance with the IS-95 standard which is transmitted to a BTS 102 of FIG. 4.

In the preferred embodiment of the invention digital signal processing system 984 is comprised of a digital signal processor (DSP) controlled by software stored in memory system (Not shown). Additionally, control system 986 is comprised of a microprocessor also controlled by software instructions stored in a memory system (Not shown). Portions of the software instructions used to control the microprocessor are used to implement interface control 987 and network control 989. In alternative embodiments of the invention, control system 986 and digital signal processing system 984 may be implemented via the use of one or more custom designed integrated circuits where network control 989 and interface control are a portion of the integrated circuits used to implement control system 986. Furthermore, while in the configuration shown, control system 986 is coupled between input output system 988 and digital signal processing system 984. In alternative embodiments of the invention each of those three systems may be coupled together via the use of mutually shared data bus. Additionally, control system 986 and digital signal processing system 984 may share the use of the same memory system via the shared data bus, or by placement on the same integrated circuit.

Thus a method and apparatus for providing wireless telecommunication service using a CDMA over the interface and a GSM communications network is described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for processing signaling messages within a base station subsystem of a wireless telecommunications system, said method comprising the steps of:
    a) transparently transporting direct transfer application part signaling messages received from a subscriber unit to a Global System for Mobile communications mobile switching center;
    b) internally processing code division multiple access signaling messages received from a subscriber unit;
    c) direct transfer application part transporting direct transfer application part signaling messages received from the Global System for Mobile communications mobile switching center to the subscriber unit; and
    d) internally processing base station subsystem mobile application part messages received from the Global System for Mobile communications mobile switching center for allocating call processing resources necessary to provide functionality requested by the base station subsystem mobile application part messages.

2. The method as set forth in claim 1, wherein step a) comprises the steps of:
    a.1) receiving a signaling message from the subscriber unit;
    a.2) determining that the signaling message is in a transport message;
    a.3) placing any contents of the signaling message into a direct transfer application part signaling message; and
    a.4) transmitting the direct transfer application part message to the Global System for Mobile communications mobile switching center.

3. A method for processing signaling messages within a base station subsystem of a wireless telecommunications system, said method comprising the steps of:
    transparently transporting direct transfer application part signaling messages received from a Global System for Mobile communications mobile switching center to a subscriber unit; and
    internally processing base station subsystem mobile application part messages received from the Global System for Mobile communications mobile switching center for allocating call processing resources necessary to provide functionality requested by the base station subsystem mobile application part messages.

4. The method as set forth in claim 3, further comprising the steps of:
- transparently transporting direct transfer application part signaling messages received from a subscriber unit to the Global System for Mobile communications mobile switching center; and
- internally processing local signaling messages received from a subscriber unit.

5. The method as set forth in claim 3, wherein step a) comprises the steps of:
- a.1) receiving a signaling message from the Global System for Mobile communications mobile switching center;
- a.2) determining that the signaling message is a direct transfer application part message;
- a.3) placing the signaling message into an internal base station subsystem protocol formatted transport signaling message; and
- a.4) transmitting the internal base station subsystem protocol formatted transport signaling message to the subscriber unit.

6. A base station subsystem of a wireless telecommunications system, said base station subsystem comprising:
- a signaling message processing system for transparently transporting a signaling message if the signaling message is a direct transfer application part message, and for performing content-based processing of the signaling message if the message is a base station subsystem mobile application part message, thereby allocating call processing resources necessary to provide functionality requested by the base station subsystem mobile application part message; and
- a radio frequency signal processing system for establishing a radio frequency interface using radio frequency signal processing in accordance with code division multiple access signal processing techniques.

* * * * *